United States Patent [19]
Arita et al.

[11] Patent Number: 5,504,502
[45] Date of Patent: Apr. 2, 1996

[54] POINTING CONTROL DEVICE FOR MOVING A CURSOR ON A DISPLAY ON A COMPUTER

[75] Inventors: Takashi Arita; Akihiko Sakaguchi; Toshinori Sasaki, all of Kawasaki, Japan

[73] Assignee: Fujitsu Limited, Kanagawa, Japan

[21] Appl. No.: 389,620

[22] Filed: Feb. 15, 1995

Related U.S. Application Data

[63] Continuation of Ser. No. 170,639, Dec. 21, 1993, Pat. No. , which is a continuation of Ser. No. 761,184, Sep. 17, 1991, abandoned.

[30] Foreign Application Priority Data

| Sep. 18, 1990 | [JP] | Japan | 2-246116 |
| Nov. 7, 1990 | [JP] | Japan | 2-299911 |
| Mar. 5, 1991 | [JP] | Japan | 3-038201 |

[51] Int. Cl.⁶ .................................................. G09G 5/08
[52] U.S. Cl. .............................................. 345/160; 345/905
[58] Field of Search .................................. 345/156, 157, 345/159, 168, 161, 167, 905; 336/30; 341/6, 5, 15; 324/207, 251, 13

[56] References Cited

U.S. PATENT DOCUMENTS

| 3,331,972 | 7/1967 | Moller. | |
| 4,680,577 | 7/1987 | Straayer et al. | 340/711 |
| 4,712,101 | 12/1987 | Culver | 340/710 |
| 4,724,715 | 2/1988 | Culver | 340/710 |
| 4,823,062 | 4/1989 | Hoffman et al. | 340/710 |
| 4,823,634 | 4/1989 | Culver | 74/471 XY |
| 4,837,489 | 6/1989 | McFee | 340/710 |
| 4,853,630 | 8/1989 | Houston | 324/207.13 |
| 4,868,549 | 9/1989 | Affinito et al. | 340/710 |
| 4,896,554 | 1/1990 | Culver | 74/471 XY |
| 4,922,444 | 5/1990 | Baba | 340/710 |
| 4,931,781 | 6/1990 | Miyakawa | 340/709 |
| 5,012,230 | 4/1991 | Yasuda | 340/709 |
| 5,021,771 | 6/1991 | Lachman | 340/711 |
| 5,065,146 | 11/1991 | Garrett | 345/161 |
| 5,095,302 | 3/1992 | McLean et al. | 340/710 |
| 5,160,918 | 11/1992 | Saposnik et al. | 345/161 |

FOREIGN PATENT DOCUMENTS

| 0249509 | 12/1987 | European Pat. Off.. |
| 0253333 | 1/1988 | European Pat. Off.. |
| 0260340 | 3/1988 | European Pat. Off.. |
| 58-113142 | 8/1983 | Japan. |
| 59-116815 | 8/1984 | Japan. |
| 60-166813 | 8/1985 | Japan. |
| 1-503418 | 11/1989 | Japan. |
| 2-115921 | 4/1990 | Japan. |
| 2216994 | 10/1989 | United Kingdom. |

*Primary Examiner*—Tommy P. Chin
*Assistant Examiner*—A. Au
*Attorney, Agent, or Firm*—Nikaido, Marmelstein, Murray & Oram

[57] ABSTRACT

A pointing control device in a computer, including a support, a manually movable actuating member movably supported by the support, and a magnetic reluctance type detector for detecting a magnitude of movement of the movable actuating member within a unit of time, so that the pointer or the cursor can be moved in accordance with the detected magnitude of movement of the movable actuating member.

45 Claims, 31 Drawing Sheets

Fig. 31A
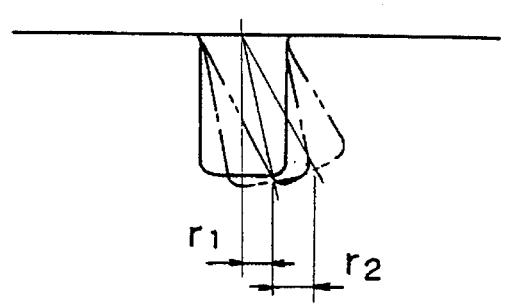
Fig. 31B
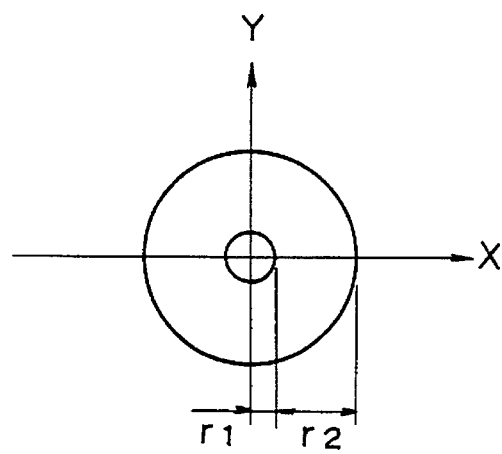
Fig. 32
| VOLTAGE | COUNT NO. |
|---|---|
| 0 | 0 |
| 2 | 0 |
| 4 | 0 |
| 6 | 0 |
| 8 | 0 |
| 10 | 2 |
| 12 | 4 |
| 14 | 8 | ive
POINTING CONTROL DEVICE FOR MOVING A CURSOR ON A DISPLAY ON A COMPUTER

This application is a continuation of application Ser. No. 08/170,639, filed Dec. 21, 1993, now abandoned which is a continuation of application Ser. No. 07/761,84, filed on Sep. 17, 1991, now abandoned.

BACKGROUND OF THE INVENTION

1. Field of the Invention

The present invention relates to a pointing control device for moving a pointer or a cursor on a display of a computer to a desired position on the display.

2. Description of the Related Art

In a conventional method of inputting and outputting data during data processing, the data is formed by utilizing an input means such as a digitizer, a mouse, a light pen, or a track ball, in addition to a keyboard, while displaying data in the form of characters or graphics on a screen of a display, such as a CRT, of a computer, and giving vocal instructions to the computer. For example, such a method is frequently used in CAD or simulations in which data is processed by graphics.

Recently, in the fields of data processing and office automation, the number of operating systems and amount of software requiring the use of a pointing device other than a keyboard, while giving vocal instructions to the computer, has increased, in an attempt to improve the operability of the computer.

Currently, there is a trend toward replacing desk-top type computers composed of a mutually independent computer main unit, keyboard and display, with a laptop type, notebook type or palm type computer, in which the computer main unit, the keyboard and the display are provided as an integrated unit, which are convenient for carrying due to their lighter weight and small size.

Therefore, a pointing device must be able to be operated not only on a desk, in the conventional manner, but also with a laptop or palm type computer. Accordingly, the pointing device must occupy less space than the conventional mouse or digitizer, etc., and be built-in to the computer unit; even in the conventional desk-top type computer, due to the need for a smaller space occupation, the pointing device must be built-in to a major component of the computer. Further, in the case of portable computers, such a device must have a low power consumption because such a unit mainly utilizes a battery as a power source thereof.

A conventional pointing device built-in to the computer unit is shown in FIGS. 45A–45C. In FIG. 45A, a bar 2 connected to a not shown sensor is provided on a keyboard 1, so that a pointer or cursor can be moved left and right by moving the bar left and right, and up and down by moving the bar backward and forward. (See Japanese Unexamined Patent Publication Kokai No. 1-503418 corresponding to U.S. Pat. No. 4,712,101; 4,724,715; 4,823,634 and 4,896, 554). FIGS. 45B and 45C show a construction in which, between a lower member 5 below a shaft 4 of a J-key or F-key as a home key and a housing 6, four sensors, e.g., tension gauges, are provided (FIG. 45B, or as shown in FIG. 45C, four sensors 7 such as tension gauges are provided, respectively, on each of four sides of the shaft 4 having a square cross-section, so that the pointer or cursor can be moved left and right by pressing the key-top 8 to the left and right, and up and down by pressing the key-top 8 backward and forward. Note, in the foregoing operation a control key must be pressed at the same time; i.e., when the key is simply pressed in the vertical direction, a normal character input can be made. (See U.S. Pat. No. 4,680,577).

In the conventional pointing devices which are built-in to the computer unit, in the construction of FIG. 45A a problem arises in that the bar 2 occupies a substantial area of the keyboard 1, and thus leads to an increase in the size thereof, and further, it cannot be operated in an oblique direction (namely, on the X-Y Cartesian plan, it is possible to operate only in the X or Y direction with one action, and thus a movement in an oblique direction must be made by a combination of movements in the X and Y directions), and therefore, the operation is inconvenient. Also in the constructions of FIGS. 45B and 45C, a delicate control must be made of the force exerted on the key-top 8 in the left, right, backward and forward directions, and thus the operability is lowered.

In view of the problems set forth above, an object of the present invention is to provide a pointing control device which can be built-in to a keyboard of a desk-top type computer and a portable compact computer unit, and can provide an enhanced operability.

SUMMARY OF THE INVENTION

To achieve the above object, according to the present invention, there is provided a pointing device for moving a pointer or cursor to a desired position on a display of a computer, wherein a pointing control device comprises a support, a manually movable actuating member movably supported by the support, and a magnetic reluctance type detector for detecting a magnitude of movement of the movable actuating member within a unit of time, so that the pointer or the cursor can be moved in accordance with the detected magnitude of movement of the movable actuating member.

According to one aspect of the present invention, the manually movable actuating member is realized by a plate-like slider member slidably supported on the support.

According to another aspect of the present invention, the manually movable actuating member is realized by a hole member defining a finger insertion hole enabling an operation by a bending of an operator's finger.

In a preferred embodiment, a permanent magnet is provided in the slider member or the hole member and magnetically reluctant elements 14, 14' are provided below the magnet, whereby the position of the slider or hole members when moved in the desired direction can be detected in accordance with a variation of a voltage resulting from an effect of the magnetic reluctance of the magnetically reluctant element.

The provision of a permanent magnet provided in the plate slider, which is dome-shaped or disk-shaped, or the hole member, and the magnetically reluctant elements makes it possible to detect the motion direction and motion distance of the magnet in accordance with a flux from the permanent magnet.

Also, since the slider or hole member can be easily operated by one finger, it can be made compact, and thus can be easily built-in to the keyboard of the computer unit.

BRIEF DESCRIPTION OF THE DRAWINGS

The invention will be described below in detail with reference to the accompanying drawings, in which:

FIGS. 31A and 31B are diagrams showing an operation range and initial operating range of the hole member in the present invention;

FIG. 32 is diagram showing a relationship between a detected voltage and a counter value stored in the MPU;

DESCRIPTION OF THE PREFERRED EMBODIMENTS

Figure 1:
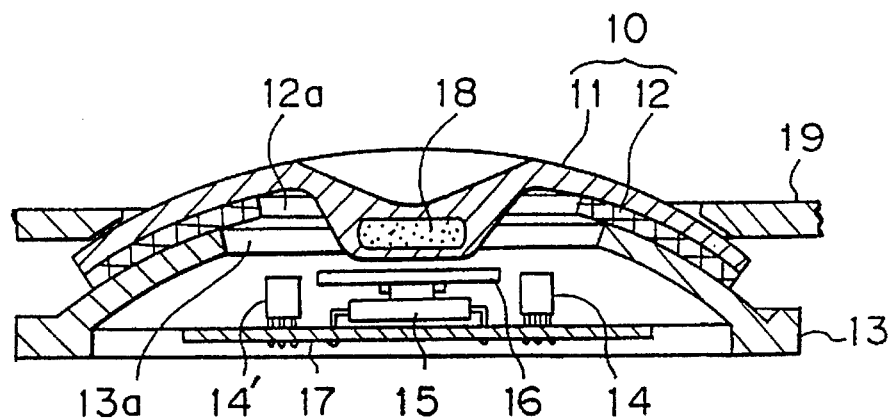
FIG. 1 is a sectional view of a pointing control device in an assembled condition according to a first embodiment of the present invention.
Figure 2:
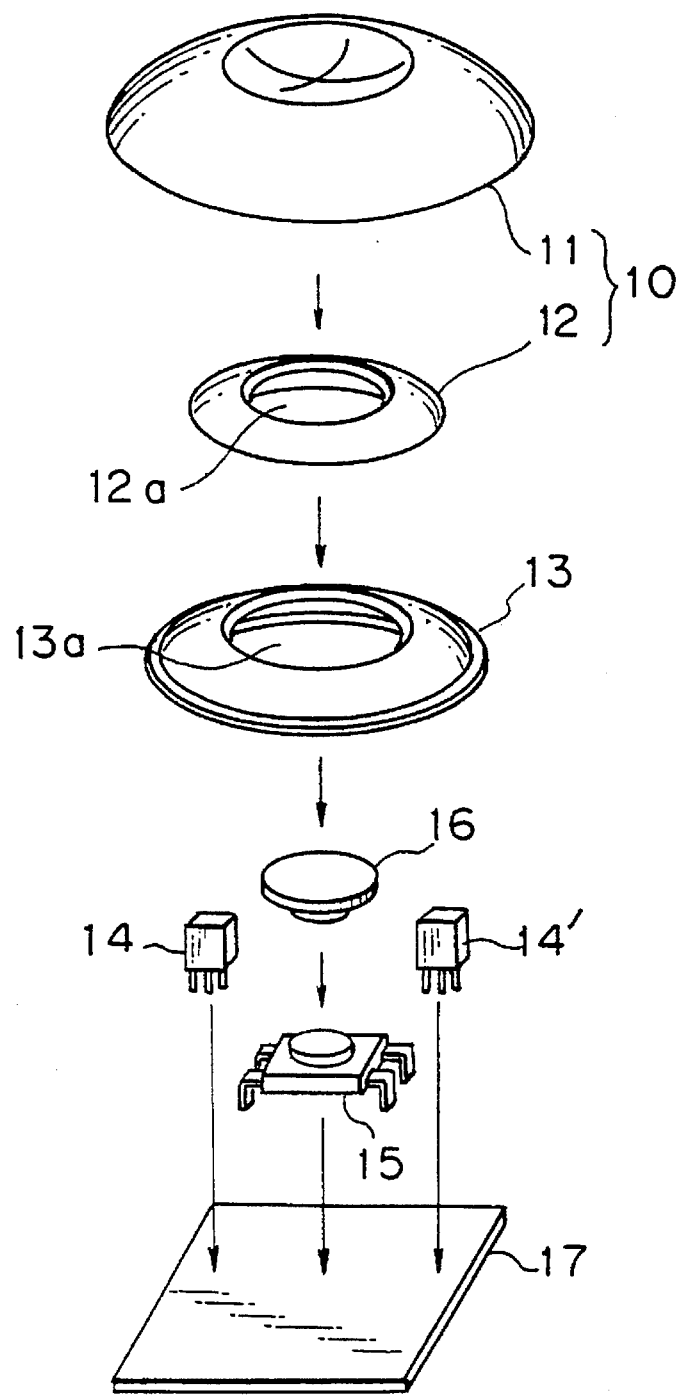
FIG. 2 is an exploded perspective view of the first embodiment shown in FIG. 1.

FIG. 1 and 2 show the first embodiment of the present invention, in which FIG. 1 is a sectional view when in an assembled condition, and FIG. 2 is an exploded perspective view. In both figures, 10 denotes a slider which includes an elastic member 11 and a dome-shaped member 12 formed with an opening 12a at the center portion thereof, 13 denotes a housing supporting the slider 10 for a free sliding movement thereon, 14 and 14' denote magnetically reluctant elements, 15 denotes a switch, 16 denotes a key-top of the switch, 17 denotes a printed circuit board on which the magnetically reluctant elements 14 and 14' and the switch 15 are mounted, 18 denotes a permanent magnet provided on the slider 10, and 19 denotes a casing of the device.

The elastic member 11 of the slider 10 can be made of an elastic material, such as a rubber, to give a better feeling during contact therewith. The elastic member 11 and the dome-shaped member 12 are coupled to each other, and the permanent magnet 18 is buried at the lower central portion of the elastic member 11. The permanent magnet can be a plastic magnet integrally formed with the elastic member 11. The housing 13 is formed into dome-shaped configuration with a large opening 13a at the center thereof, and the slider 10 is slidably supported on the housing 13. The magnetically reluctant elements 14 and 14' and the switch 15 are mounted on a printed circuit board and fixed beneath the slider 10.

Figure 3A:
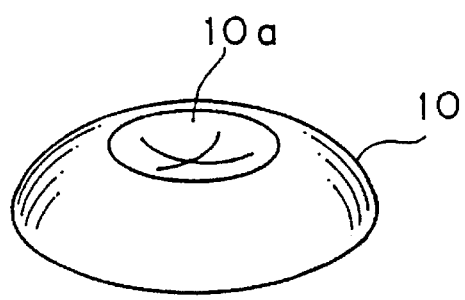
FIGS. 3A and 3B are schematic views showing two ways of improving the touch when operating the slider of the first embodiment.
Figure 3B:
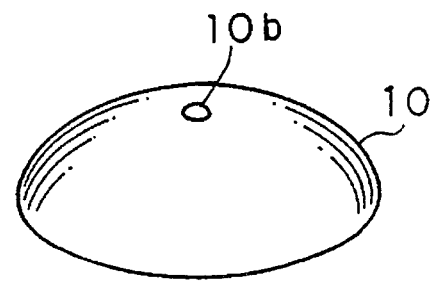
Figure 4A:
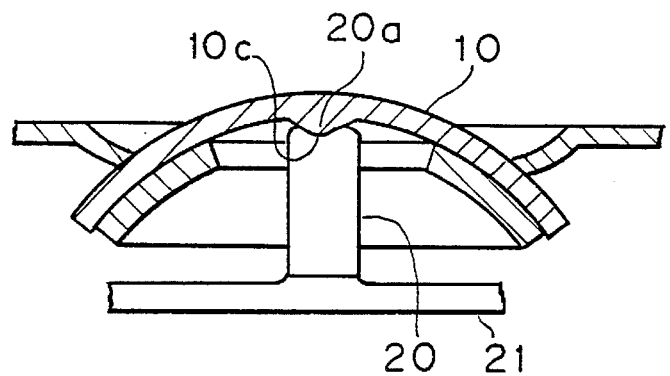
FIGS. 4A and 4B are sectional views of two different origin position recognition means in the slider of the first embodiment.
Figure 4B:
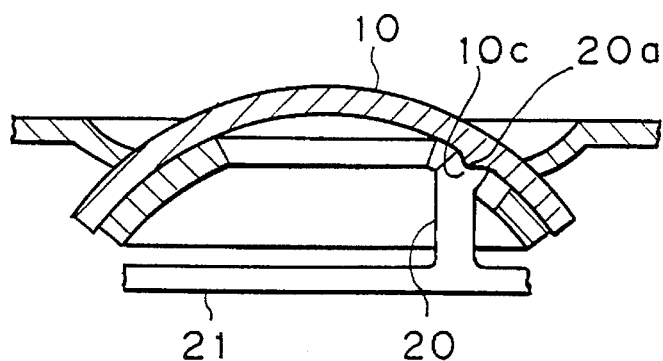

To further enhance the feeling when operating the elastic member 11 of the slider, a crater-like recess 10a can be formed at the center portion thereof, as shown in FIG. 3A, or as an alternative, a small projection 10b can be provided at the center portion thereof as shown in FIG. 3B, whereby the origin position of the slider can be easily recognized. Also, as an origin position stopper means, projections 10c projecting from the lower surface of the slider 10 can be provided, to engage with projections 10c having recessed portions 20a in legs 20 extending from a base 21, as shown in FIGS. 4A and 4B.

Figure 5:
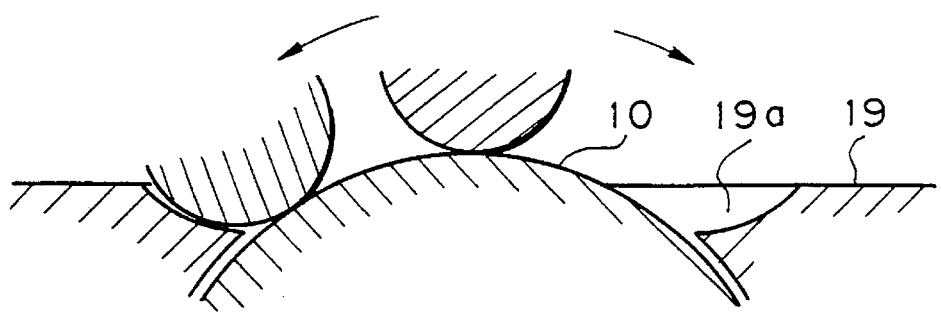
FIG. 5 is a sectional view of a cover for improving the operability of the first embodiment.

Furthermore, to improve the operability, a dent 19a can be formed along the circumference of the opening of the casing 19, to enable an easy identification of the stroke limit of the slider, and thus avoid a possibility of pinched fingers or other injuries when rapidly operating the slider 10 to the limit of its stroke, as shown in FIG. 5.

Figure 6A:
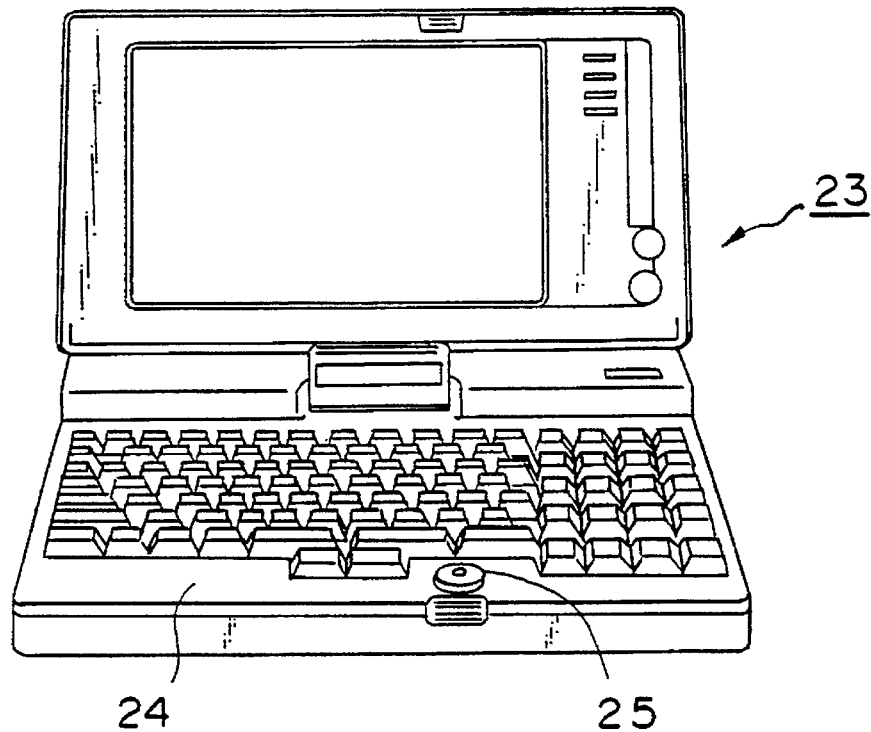
FIGS. 6A and 6B are schematic views showing a pointing control device of the present invention, installed in a keyboard of a small computer, by way of example.
Figure 6B:
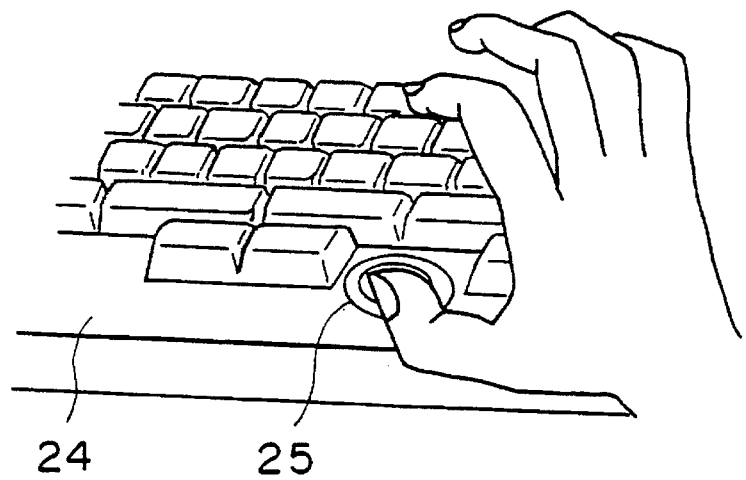

The shown embodiment is used in the manner illustrated in FIGS. 6A and 6B. FIG. 6A illustrates the embodiment of the pointing control device 25 when actually installed in a keyboard section 24 of a portable small-size computer 23. The pointing control device 25 is arranged at a position such that it can be conveniently operated during a keyboard operation by placing the hands at the home position, as shown in FIG. 6A. FIG. 6A and 6B show an example of the device when arranged in the vicinity of the nearest end, for convenient operation by the thumb. The location of the pointing control device 25 is not limited to FIGS. 6A and 6B, and can be modified as discussed hereinafter.

Figure 7A:
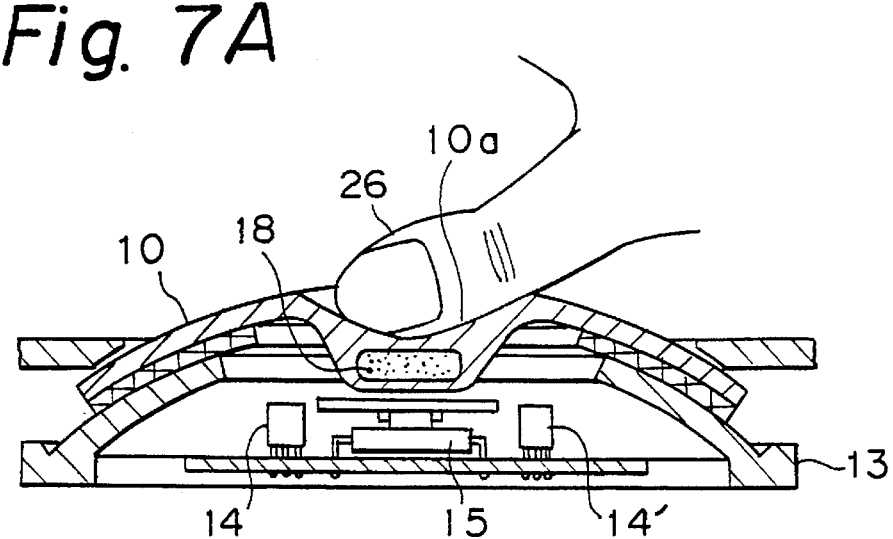
FIGS. 7A, 7B and 7C are sectional views of a pointing control device of the first embodiment, shown in different operational positions.
Figure 7B:
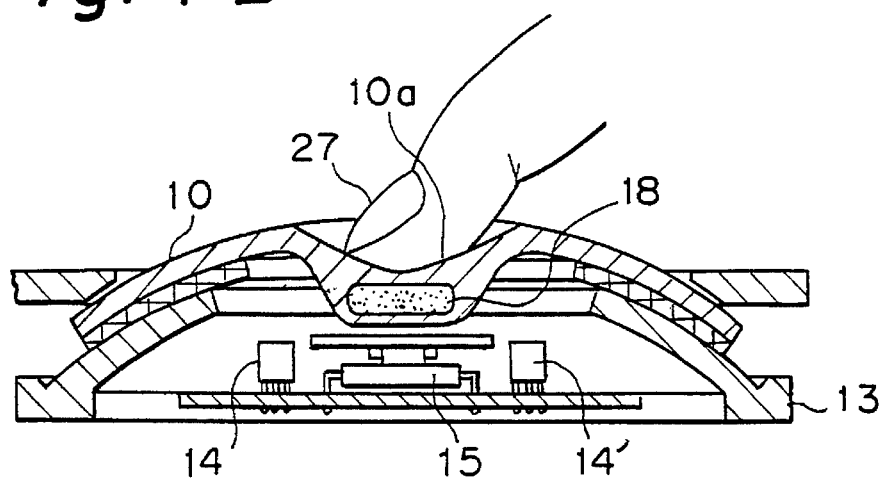
Figure 7C:
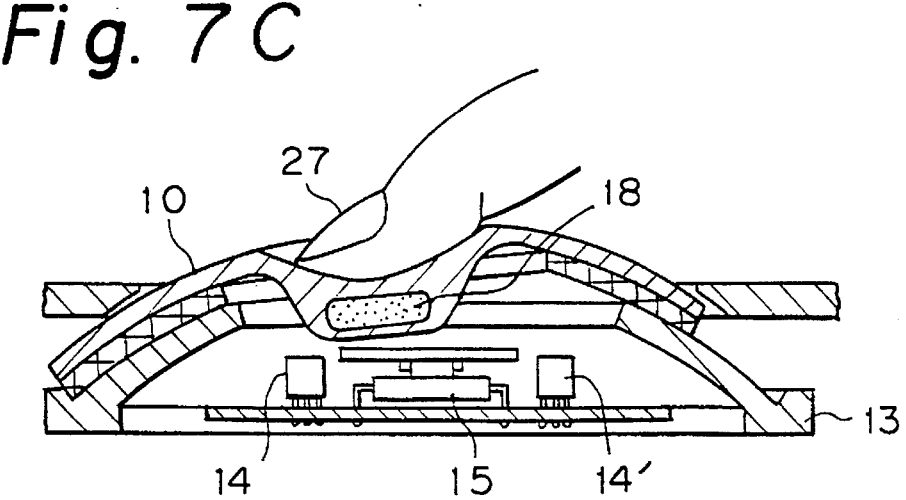

FIG. 7A through 7C show the operation of the embodiment of the pointing control device. FIG. 7A shows the condition when the operation is made by using the thumb, where the thumb 26 is placed in the recess 10a at the center of the slider 10. FIG. 7B shows an example of an operation with a finger, such as the index finger. In this case, similar to the case of FIG. 7A, the index finger 27 is placed within the recess 10a of the slider 10 to operate the slider 10 as shown in FIG. 7C. When the slider is to be operated by a finger other than the thumb, it is preferable to arrange the pointing control device at the side away from the operator, to enable a better operability.

Figure 8A:
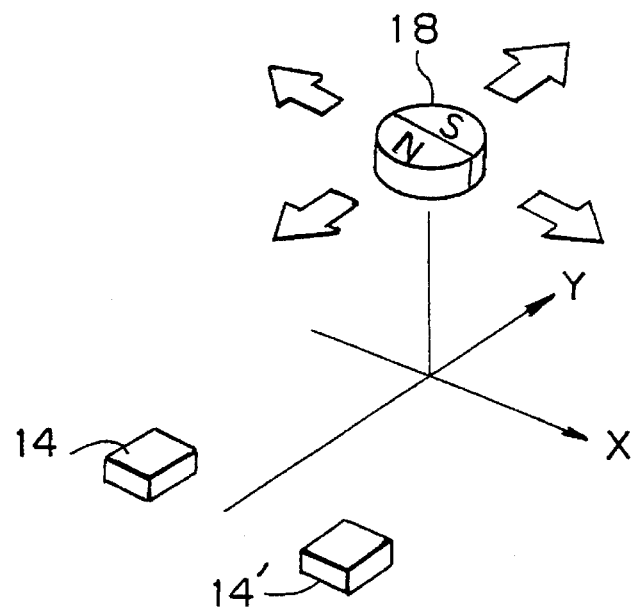
FIGS. 8A and 8B are explanatory views showing how to detect the displacement of a slider.
Figure 8B:
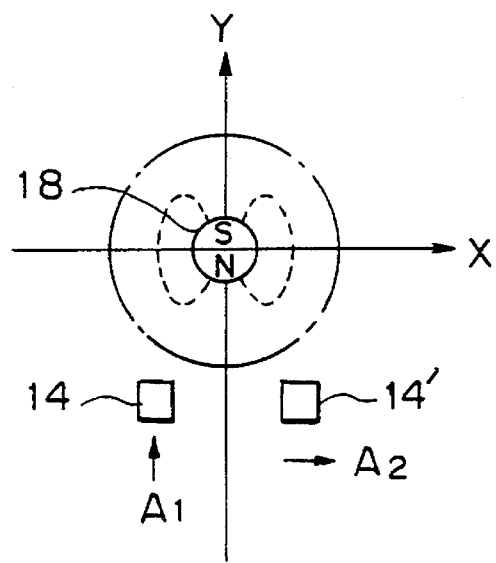

FIGS. 8A and 8B shows the way of detecting a displacement of the slider, wherein FIG. 8A is a perspective view and FIG. 8B is a plan view.

When the permanent magnet 18 fixedly attached to the slider is moved to a desired coordinate position on the X axis and Y axis, according to the movement of the slider, the resistance value of the magnetically reluctant elements 14 and 14' is varied by the effect of the magnetic reluctance caused by a variation of the magnetic flux. The provision of the magnetically reluctant elements 14 and 14' for a magnetic detecting of a directional movement, as illustrated by arrows $A_1$ and $A_2$, enables the displacement of the slider in the X and Y directions to be detected from the corresponding variations of the magnetic reluctance, respectively.

At this time, the pointer or cursor on the display of the computer can be moved by an acceleration control of the displacement magnitude. The details of this control will be discussed later.

In practical operation, when the slider is operated with a large magnitude of movement, the movement of the pointer or cursor on the display of the computer is large. Alternatively, when the slider is operated with a small or tiny magnitude, the movement of the pointer or cursor is small or fine.

The operator moves the pointer or cursor on the display by a finger action, and visually confirms the position of the pointer or cursor on the display, for a readjustment thereof by the finger action. Since this sequence of operations is controlled in a feedback manner, the operability can be maintained at a required level.

Figure 9A:
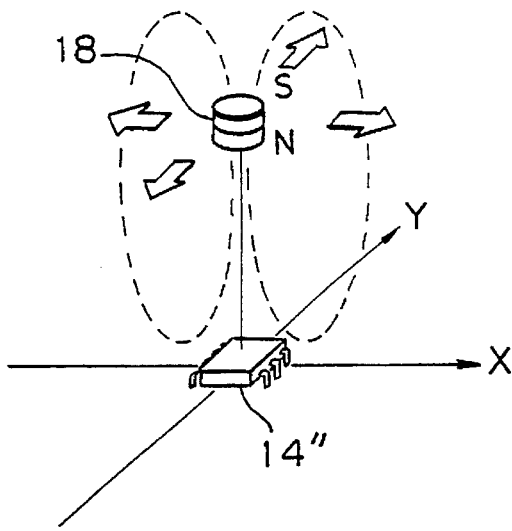
FIGS. 9A and 9B are explanatory views showing another way of detecting the slider displacement.
Figure 9B:
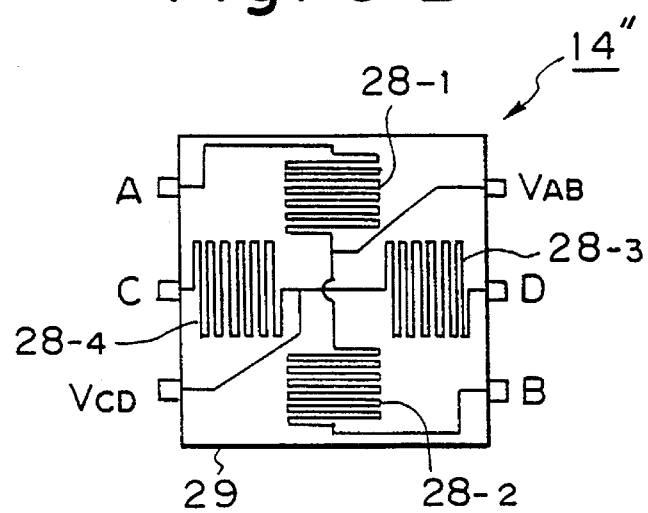

FIGS. 9A and 9B show another embodiment of a slider displacement detecting mechanism, in which FIG. 9A shows a perspective view and FIG. 9B shows a plan view of the magnetically reluctant elements.

Figure 18:
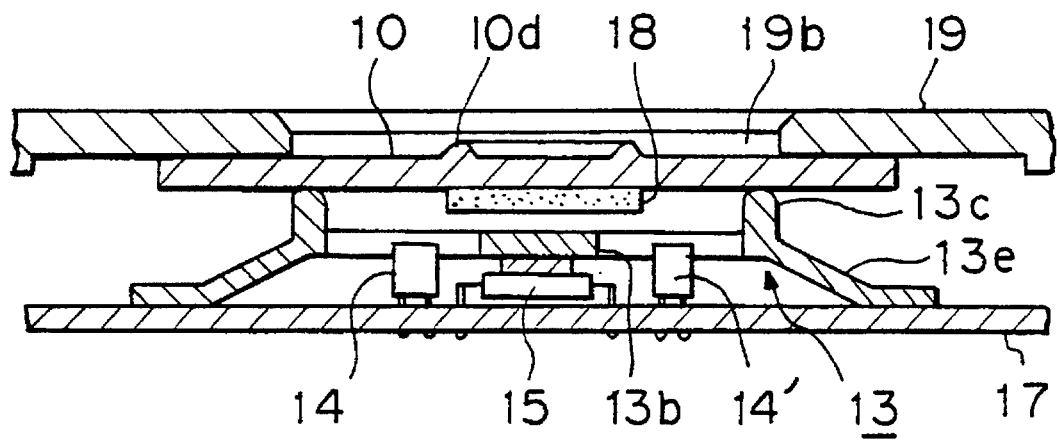
FIG. 18 is a sectional view of a control device according to a fourth embodiment of the present invention.

In FIG. 9A, 18 denotes a permanent magnet provided on the slider 10, which is magnetized in the vertical direction (in the embodiment of FIGS. 8A and 8B, the magnetizing direction is horizontal), and 14 denotes a magnetically reluctant element arranged just below the permanent magnet 18. The magnetically reluctant element 14 is formed by barber-pole type magnetic reluctance patterns 28-1–28-4 on a substrate 29, and each two opposing patterns are connected in series to each other. Accordingly, by applying a voltage between the terminals AB and CD, a magnetic flux acts on the magnetic reluctance patterns connected in series, in a differential manner, due to a movement of the permanent magnet, and therefore, voltages proportional to a magnitude of displacement of the permanent magnet 18 are output through terminals VAB and VCD.

The detecting mechanism utilizing variations of the magnetic reluctance by the magnetically reluctant elements has the advantages of a low power consumption and simple construction.

In the shown embodiments, a click button provides functions equivalent to other pointing devices such as a mouse, track ball, or digitizer. In the construction of FIG. 1, by depressing the center portion of the elastic member 11, the wide area key-top 16 can be depressed at any position of the slider, to thereby operate the switch 15.

Figure 10:
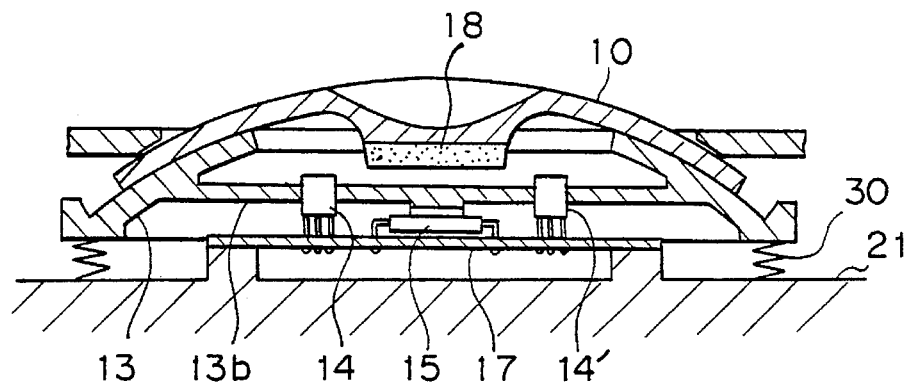
FIG. 10 is a sectional view showing another example of a switch pressing means of the first embodiment.

In another means of operating the switch 15, a switch depression plate 13b is provided in the housing 13, as shown in FIG. 10. The housing 13 is supported in a floating condition on the base 21 by springs 20, and the switch 15 is operated by pressing the slider 10.

The slider acceleration control will be discussed with reference to FIGS. 11 and 12.

Figure 11:
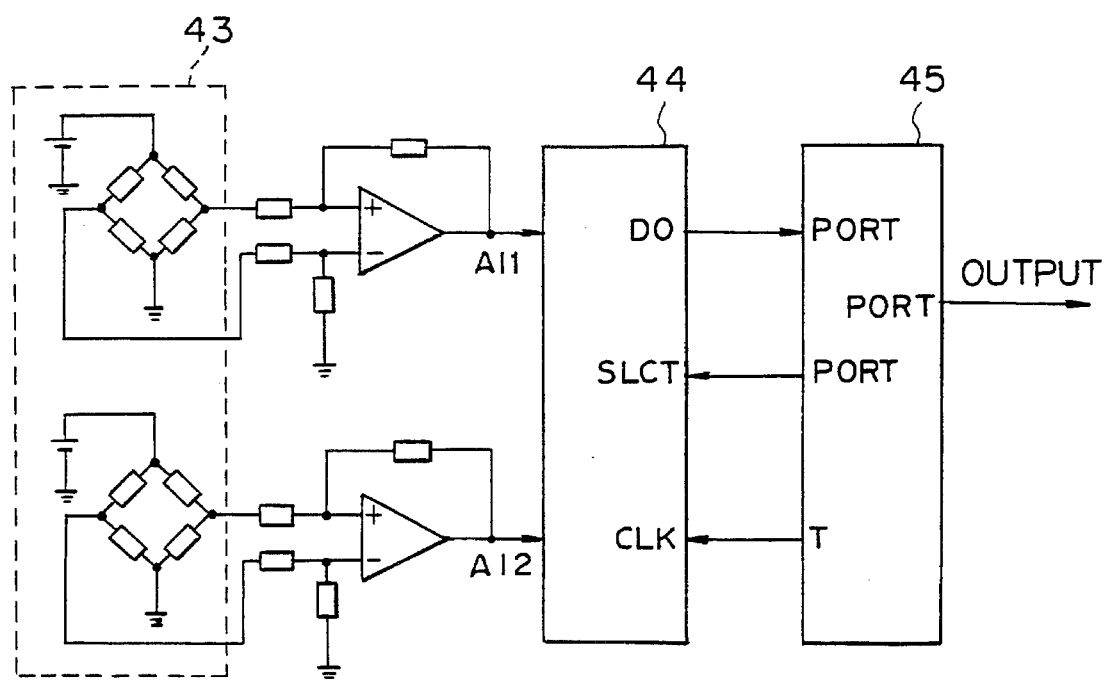
FIG. 11 is a circuit diagram for performing an acceleration control.
Figure 12:
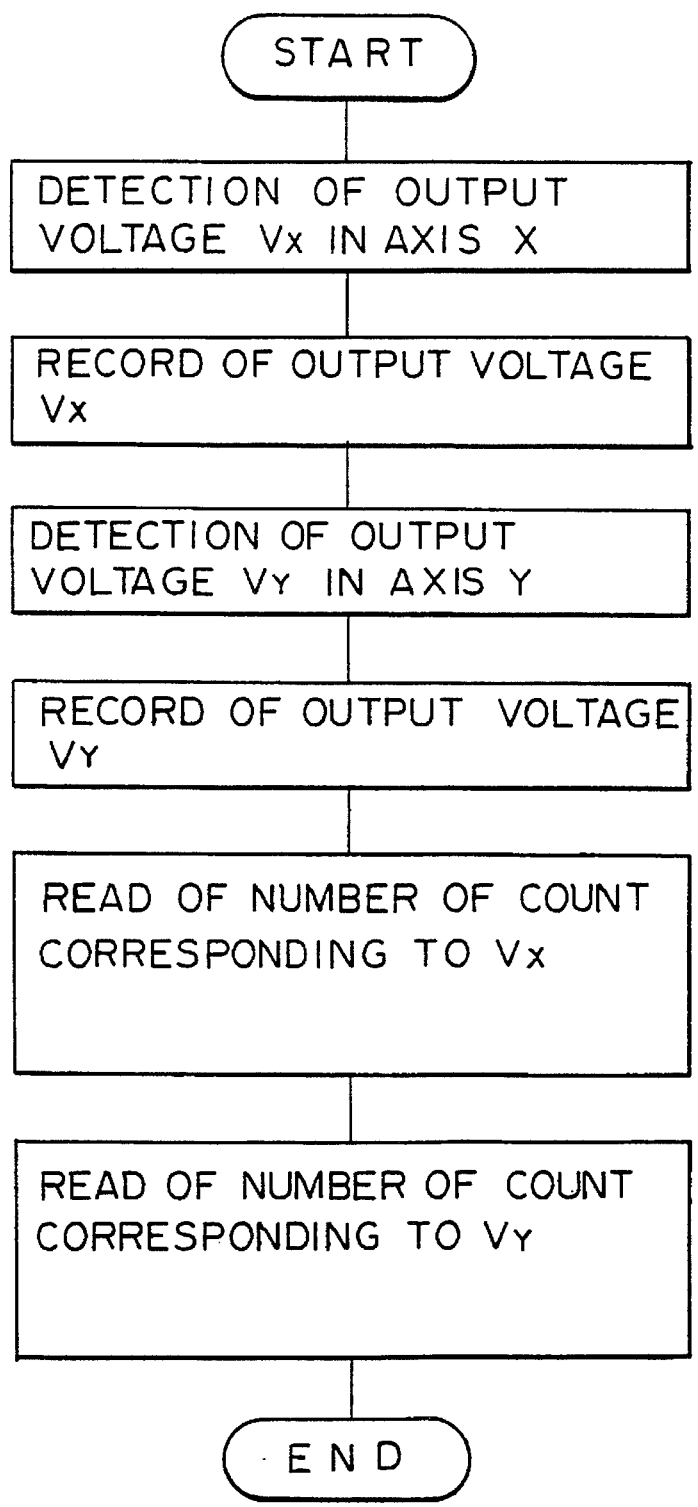
FIG. 12 is a flowchart of an acceleration control.

FIG. 11 is a circuit diagram of a control circuit, wherein 43 denotes a detecting section (this figure shows the detecting section of the embodiment of FIGS. 9A and 9B) for detecting a magnitude of displacement of the slider 10, 44 denotes an A/D converter, and 45 denotes an MPU.

An X axis displacement signal and Y axis displacement signal output from the detecting section 43 when detecting a magnitude of variation of the magnetic reluctance or a magnitude of rotation of the encoder, are amplified and then digitally converted by the A/D converter 44, and the MPU 45 then performs an acceleration control to thus obtain an output. The flowchart of the acceleration control is shown in FIG. 12A.

As shown in FIG. 12A, first the X axis output voltage output corresponding to a magnitude of displacement along the X axis is measured and stored, then in the same way, the output voltage corresponding to the magnitude of displacement along the Y axis is measured and stored.

The MPU is provided with a table, as shown below, for outputting a counter value representing an acceleration corresponding to the voltage values in the X and Y axes directions. For example, when the X axis voltage value is 2 and the Y axis voltage value is 8, the respective counter values 10 and 40 are output to thereby output a displacement command 10 times for the X axis and 40 times for the Y axis in a unit of time, to thereby control the cursor.

TABLE

| Voltage | Count value |
|---------|-------------|
| 0 | 0 |
| 2 | 10 |
| 4 | 20 |
| 8 | 40 |

The cursor movement by an acceleration control as set forth above has an advantage in that the stroke of the displacement of the slider 10 can be made smaller, to thus facilitate the operation and enable the device to be made compact. In particular, the lateral size of the device can be reduced, so that the device can be accommodated in a space of one key of the keyboard.

Figure 13:
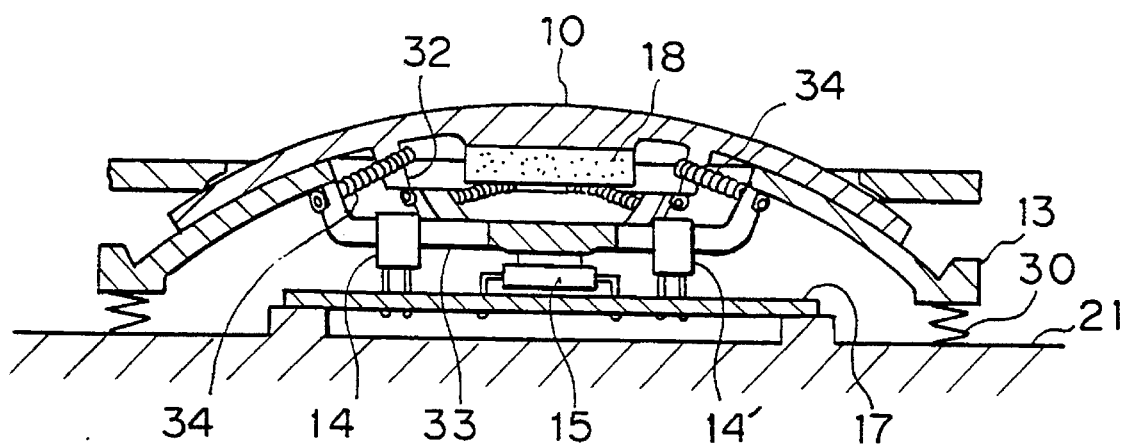
FIG. 13 is a view similar to FIG. 1, according to a second embodiment of the present invention.
Figure 14:
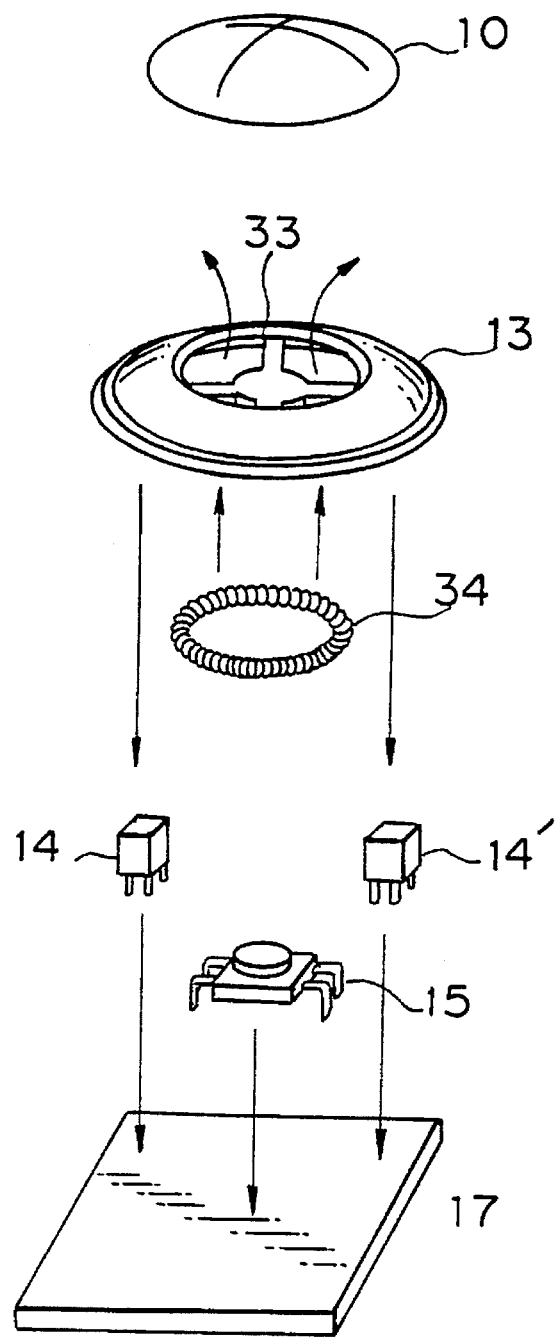
FIG. 14 is an exploded perspective view of the second embodiment of the invention shown in FIG. 13.

FIGS. 13 and 14 show a second embodiment of the present invention, in which FIG. 13 shows a cross-section view in the assembled condition and FIG. 14 is a exploded perspective view.

In both figures, 10 denotes a dome-shaped slider having a permanent magnet 18 and a plurality of projections 32 for hooking garter springs, on the lower surface thereof, to which a garter springs are attached, 13 denotes a housing for slidably supporting the slider and is provided with a large opening at the center thereof, and a garter spring hooking and switching depressing frame 33 provided on the lower surface thereof, 17 denotes a printed circuit board, on which the magnetically reluctant elements 13 and 14' and the switch 15 are mounted, and 34 denotes a garter spring alternatively hooked onto the projections 32 of the slider and the frame 33 of the housing, to thereby return the slider 10 to the origin position thereof. Although not illustrated, a crater-like recess or projection, as in the first embodiment (FIG. 1) can be provided at the upper portion of the slider 10. Also, it is possible to employ the displacement detecting means shown in FIG. 9. Further, the permanent magnet 18 can be bonded, buried or formed by a plastic magnet, when attached thereto. Alternatively, it is possible to magnetize the central lower section of the slider 10. The garter spring 34 can be easily assembled, in such a manner that it is first hooked to the hooking sections of the frame 33 of the housing and then pulled upward toward the upper surface of the housing 13 and hooked onto the projections 32 of the slider 10.

Figure 15A:
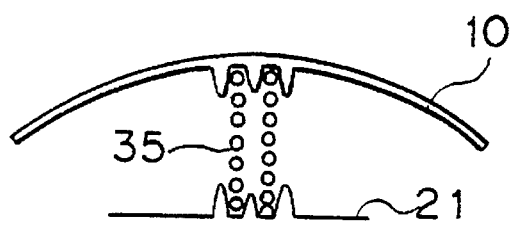
FIGS. 15A, 15B and 15C are schematic views of three examples of means for returning the slider to the original position.
Figure 15B:
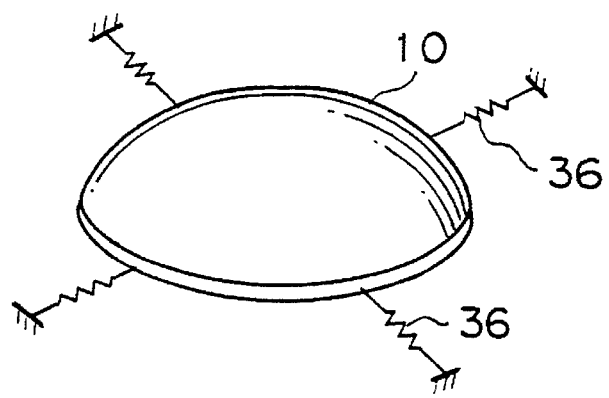
Figure 15C:
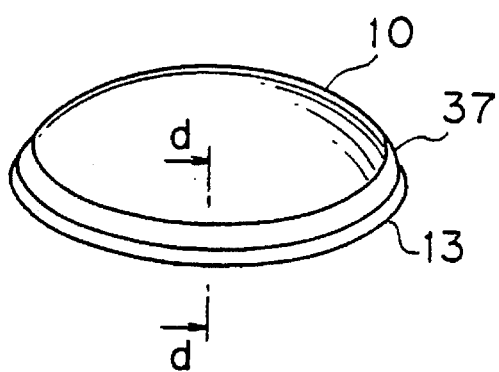
Figure 15D:
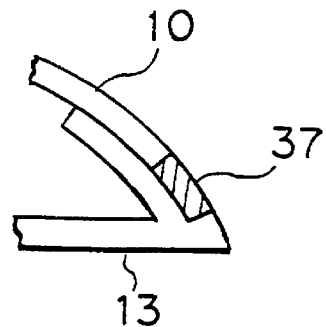
FIG. 15D is a partial sectional view taken along the line d—d in FIG. 16C.

Another means for returning the slider 10 to the origin position, in place of the garter spring, is illustrated in FIGS. 15A through 15D. The construction shown in FIG. 15A employs a compression spring 35 between the slider 10 and the base 21; the compression spring 35 is distorted during the slider movement, and thus returns the slider 10 to the original position by a recovery to the original state thereof. FIG. 15B shows a construction in which a plurality of tension springs 36 are provided for pulling the slider in any direction. FIGS. 15C and 15D show a construction in which a rubber piece 37 is disposed between the outer periphery of the slider 10 and the housing 13. In all of the above cases, the resilient or elastic force of the springs 35, 36, or rubber piece 37, returns the slider 10 to the origin position thereof.

Figure 16:
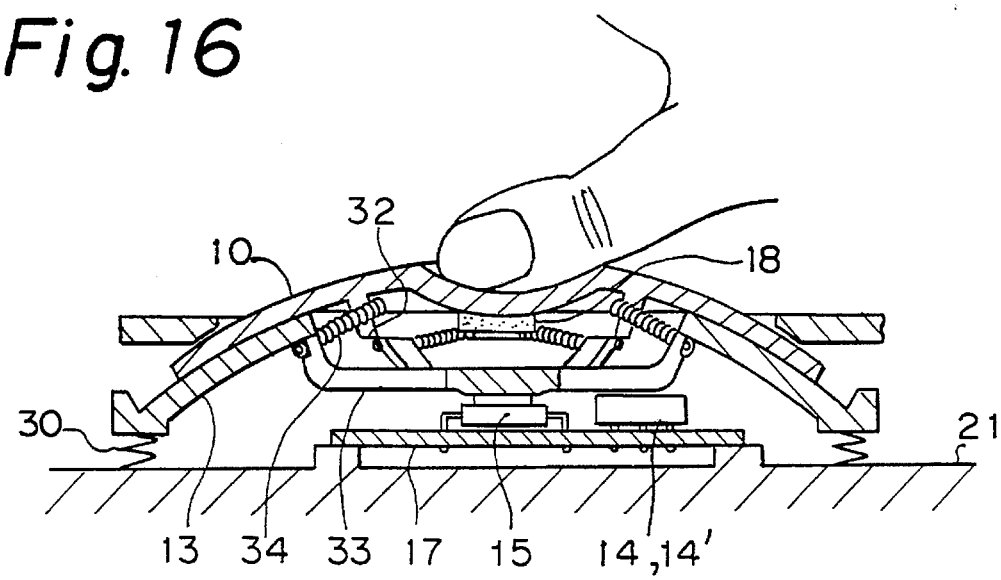
FIG. 16 is a view of the second embodiment, shown in an operational position.

The embodiment described above is operated as shown in FIG. 16. In this figure, the slider 10 is moved backward and forward, or left and right, by the thumb. The displacement of the slider 10 is detected by the magnetically reluctant elements 14 and 14', and when the thumb is removed from the slider 10, the slider is automatically returned to the origin position by the return means such as the garter spring. Further, when the slider 10 is pressed down, the switch 15 is operated, through the housing 13, and closed.

Figure 17A:
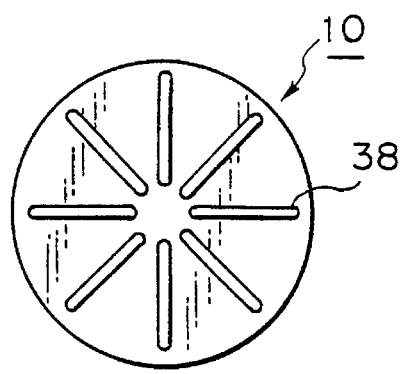
FIGS. 17A, 17B, 17C and 17D are views of a slider and a housing in a third embodiment of the present invention.
Figure 17B:
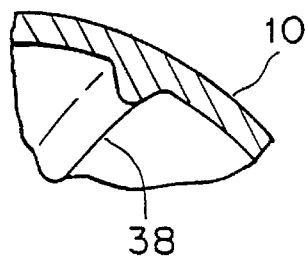
Figure 17C:
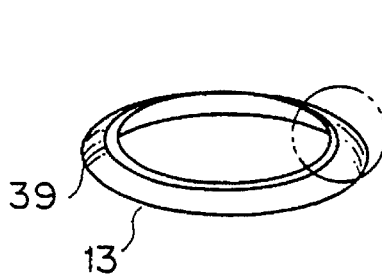
Figure 17D:
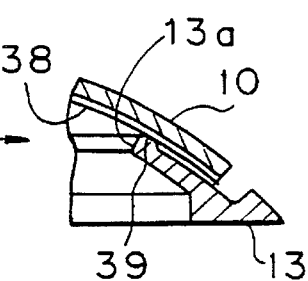

FIGS. 17A through 17D are views showing the major part of the third embodiment of the present invention, in which FIG. 17A shows the lower surface of the slider 10, FIG. 17B is a partial sectional view of the slider, FIG. 17C is a perspective view of the housing 13, and FIG. 17D is a partial sectional view of the slider when supported on the housing.

The construction of this embodiment is essentially the same as that of the first embodiment (FIG. 1) or the second embodiment (FIG. 13), and is different only in that a plurality of radially extending elongated projections 38 are provided on the lower surface of the slider 10 as shown in FIGS. 17A and 17B, and an annular projection 39 is formed along the peripheral edge of the opening as shown in FIGS. 17C and 17D, to thereby establish point contacts at a plurality of positions.

This embodiment provides an enhanced slidability of the slider, and the opening 13a at the center of the housing 13 is made greater to facilitate the addition of other functions. This embodiment also has the advantages achieved by the first and second embodiments.

Figure 19:
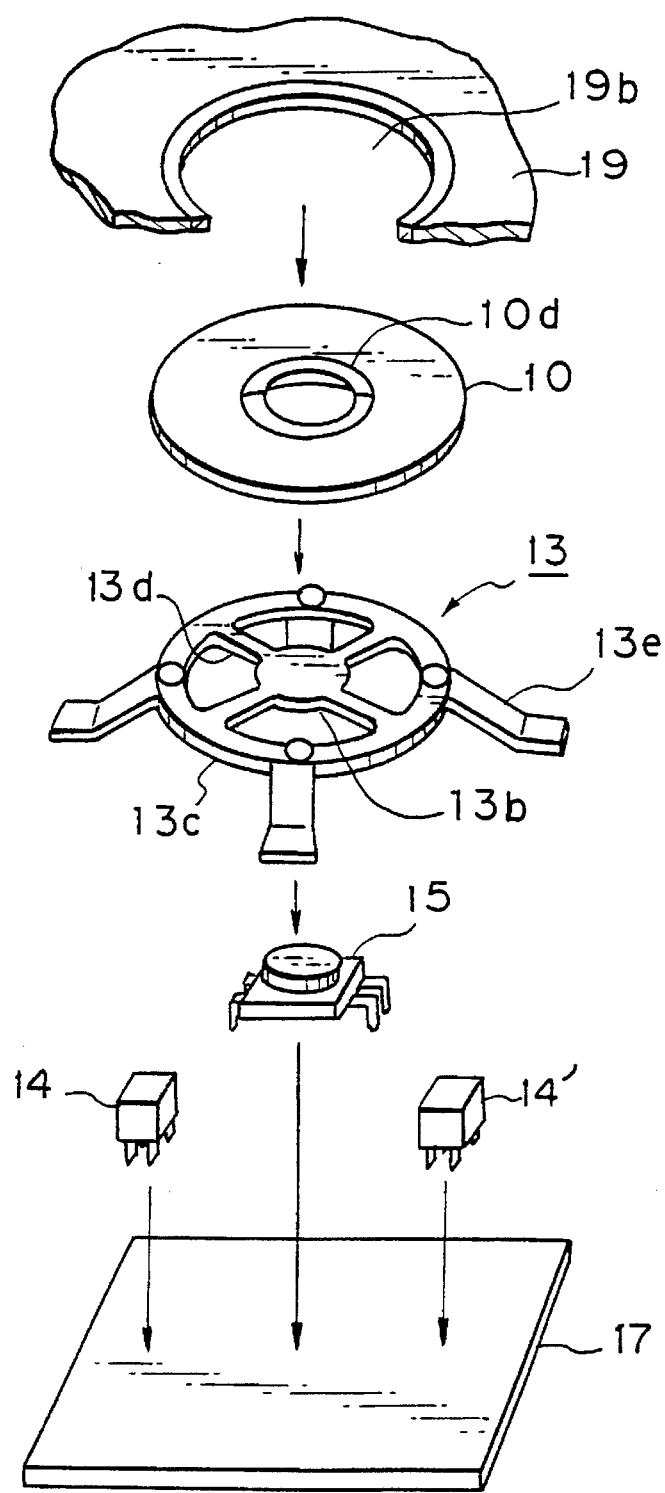
FIG. 19 is an exploded perspective view of the fourth embodiment shown in FIG. 18.

FIGS. 18 and 19 show the fourth embodiment of the present invention, in which FIG. 18 is a sectional view when in an assembled condition, and FIG. 19 is a exploded perspective view.

In both figures, 10 denotes the slider, 13 denotes the housing, 14 and 14' denote magnetically reluctant elements, 15 is the switch, 17 is the printed circuit board, 18 is a permanent magnet, and 19 is the casing.

Figure 9B:
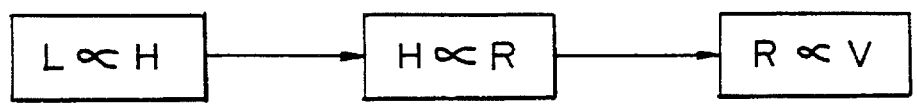

The slider 10 is formed into a disc-shaped configuration with an annular projection 10d having a semicircular cross section or a small projection similar to the small projection 10b in FIG. 3. The permanent magnet 18 is provided on the lower surface of the slider 10. The housing 13 is provided with a central small disc section 13b supported by a plurality of arms 13d extending from an annular section 13c, which annular section 13c supports the slider 10 for movement in the desired direction. The switch 15 is arranged immediately below the small disc section 13b of the housing, together with the printed circuit board 17 on which the magnetically reluctant elements 14 and 14' are mounted, and a circular window 19b is formed through the casing so that the slider can be operated through this window 19b. The positional relationship between the magnetically reluctant elements 14 and 14' and the permanent magnet 18 is similar to that of the first embodiment of FIG. 1, but the construction as shown in FIG. 9 is also applicable. Also, it is possible to employ the origin returning means (FIG. 13 or FIG. 15) for the slider, as in the second embodiment.

Figure 20A:
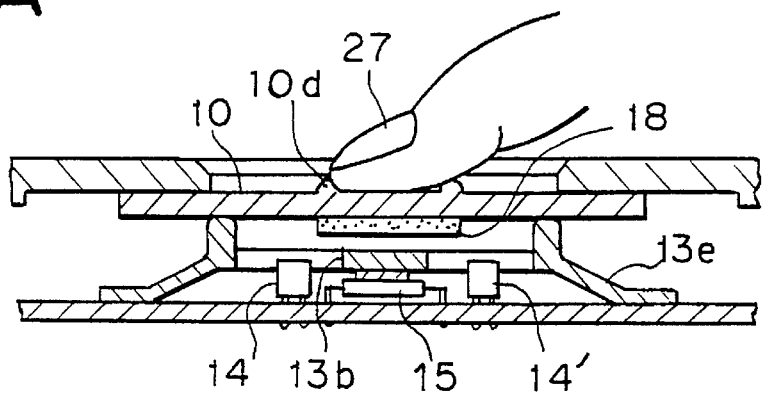
FIGS. 20A, 20B and 20C are sectional views of the fourth embodiment, shown in different operational positions.
Figure 20B:
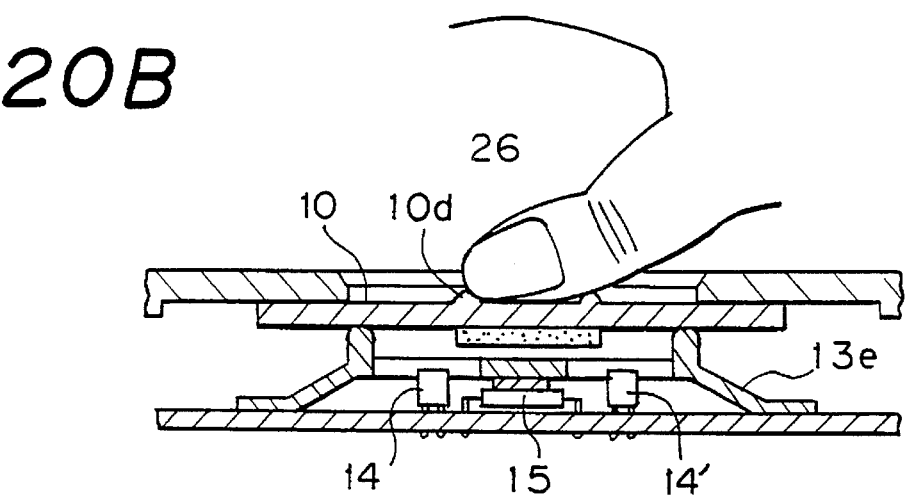
Figure 20C:
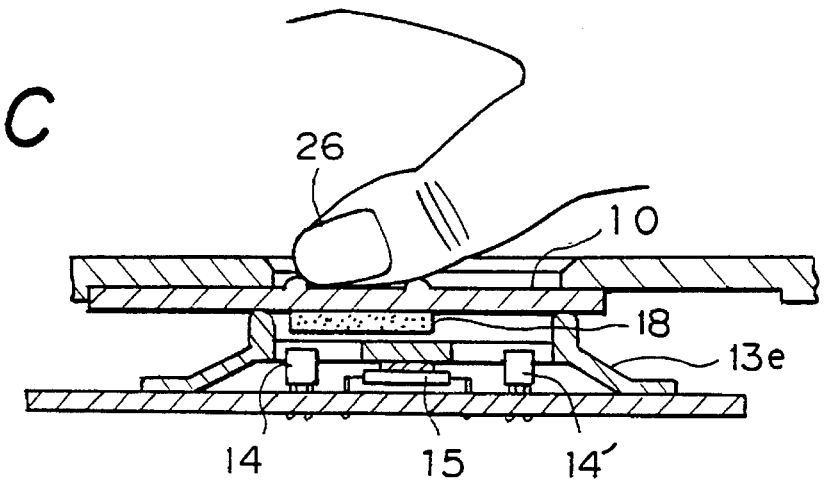

This embodiment is operated as shown in FIGS. 20A through 20C. FIG. 20A shows the condition in which the slider 10 is operated by an index finger 27. Namely, the slider 10 is operated by placing the index finger 27 within the area defined by the annular projection 10d of the slider 10, and a displacement of the slider 10 is detected by the magnetically reluctant elements 14 and 14', in the same manner as in the first embodiment. When the slider 10 is depressed in the vertical direction, the resilient legs 13e of the housing are deformed to depress and close the switch 15, through the small disc section 13b.

FIG. 20B shows the condition in which the slider 10 is operated by the thumb 26, and FIG. 20C shows the condition in which the slider 10 is moved to the left by the thumb 26. Similar to FIG. 20A, the magnitude of displacement of the slider 10 is detected by the magnetically reluctant elements 14 and 14', and further, by depressing the slider downward, the switch 15 is closed.

This fourth embodiment enables the device to be made compact and thinner, by a flat-plate configuration of the slider. Therefore, this embodiment is particularly effective for palm type computers in which the space for installation of the pointing device is strictly limited.

As set forth above, according to the present invention, a compact and thin pointing device can be realized by forming the slider in a dome or flat-plate configuration, and detecting the motion of the slider by the permanent magnet provided on the slider and the magnetically reluctant element arranged therebelow. Furthermore, it is possible to lower the power consumption to thereby enable an application thereof to the laptop type, the note book type or palm type computer. Also, by building the device into the keyboard of a desk-top type computer, it becomes unnecessary to provide the working space usually required for the conventional mouse and digitizer, and thus enables a saving of space.

Figure 21:
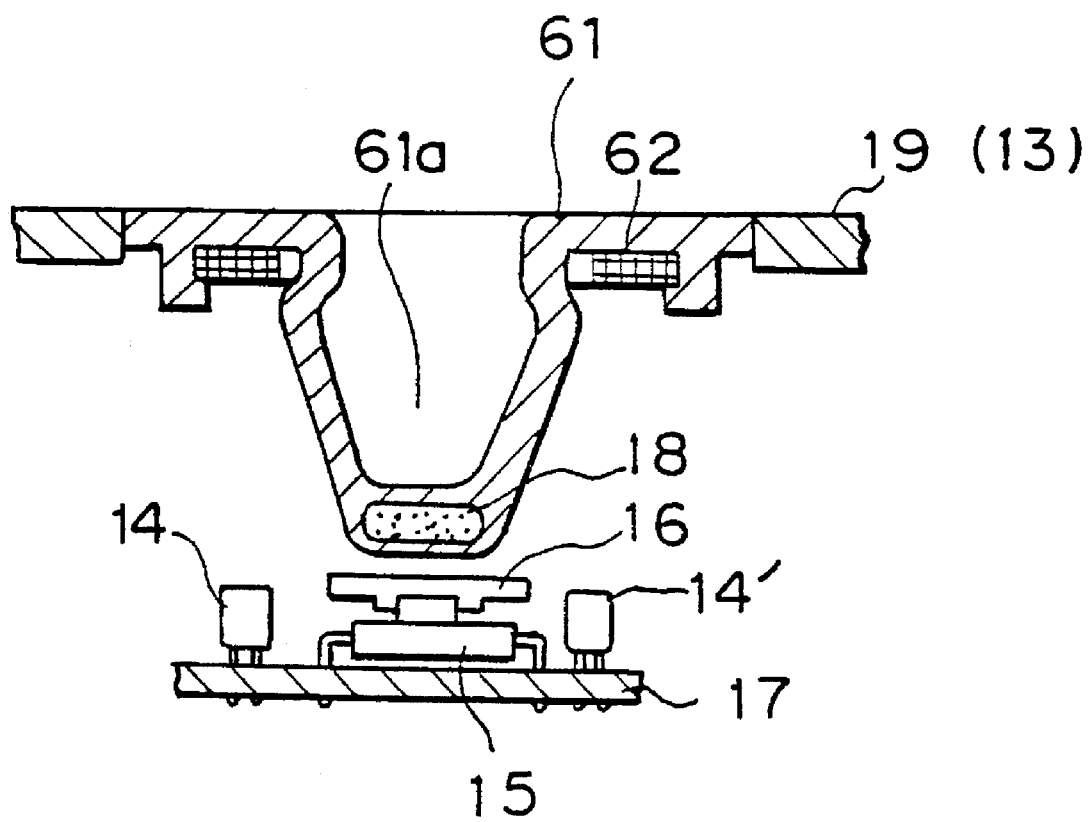
FIG. 21 is a sectional view of a pointing control device according to a fifth embodiment of the present invention.
Figure 22:
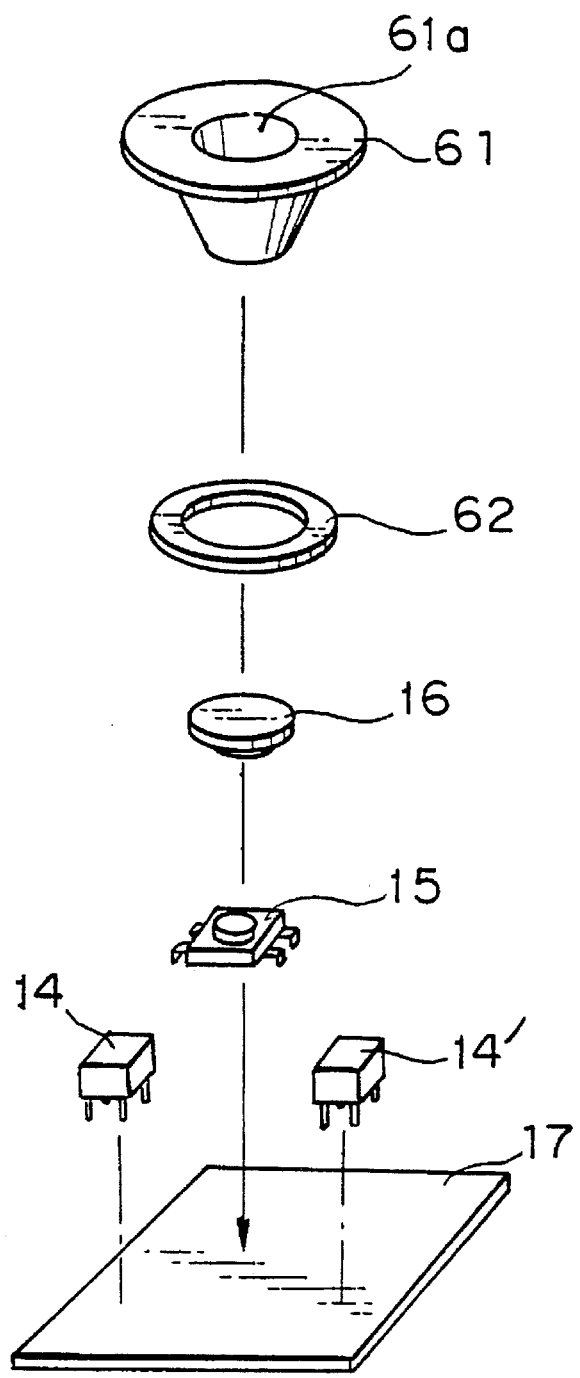
FIG. 22 is an exploded perspective view of the fifth embodiment of the invention shown in FIG. 21.

FIGS. 21 and 22 show a fifth embodiment of the present invention, in which FIG. 21 shows a cross section views when assembled and FIG. 22 shows an exploded perspective view.

In the drawings, 61 denotes a hole member, 62 denotes a coupling for holding the root portion of the hole member 61, and 19 denotes a casing for supporting the hole member 61. The casing 19 in FIGS. 21 and 22, and in the subsequent figures, functions as the support body 13 of the previous embodiments. A permanent magnet 18 is buried in the bottom of the hole member 61. The switch 15, the key top 16, the magnetic sensor (magnetically reluctant elements 14, 14'), etc., mounted on the printed circuit board 17 are the same as those of the first embodiment (FIG. 1) of the invention. The hole member 61 is made of an elastic material, such as rubber, and defines therein a hole 61a for an insertion of the index finger, for example, therein. Note, instead of the permanent magnets 14, 14' the hole member 61 is can be formed of a magnetic rubber.

The coupling 62 is engaged and fixed at the root portion of the hole member 61. The device of the invention is comprised of a fewer number of components which can be mass-produced, and can be easily and inexpensively assembled by successively superimposing one on the other.

Figure 23:
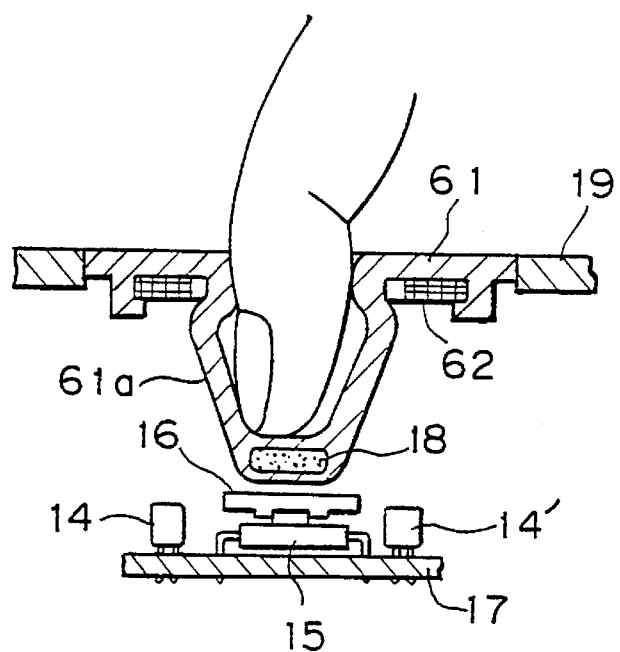
FIGS. 23 and 24 are sectional views of the fifth embodiment, shown in different operational positions.

FIG. 23 shows the operation achieved by bending the index finger inserted in the hole 61a of the hole member 61.

Figure 24:
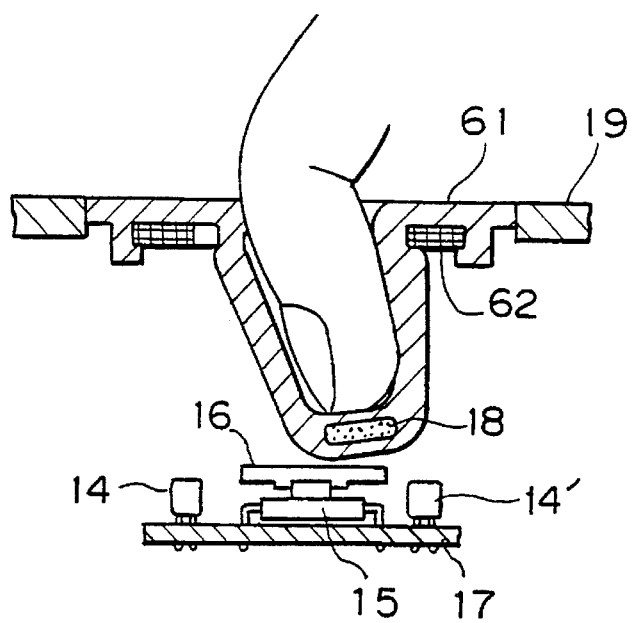

FIG. 24 shows the operation achieved by bending the index finger. Namely, by bending the index finger, the permanent magnet 18 fixed to the bottom of the hole member 61 is moved. The method of detecting the movement of the magnet 18 has been discussed hereinbefore with reference to FIGS. 8A and 8B.

Figure 25:
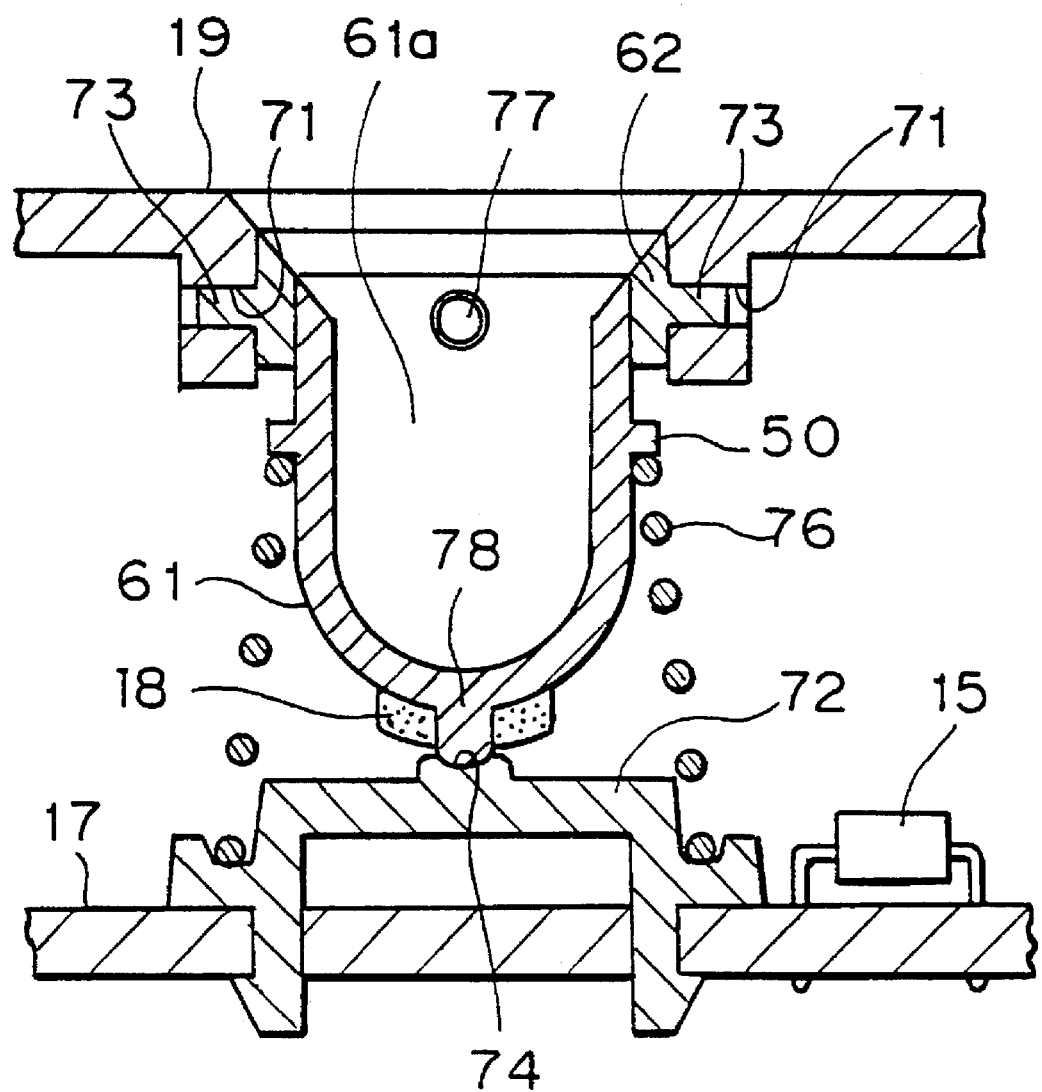
FIG. 25 is a sectional view of a sixth embodiment of the present invention.
Figure 26:
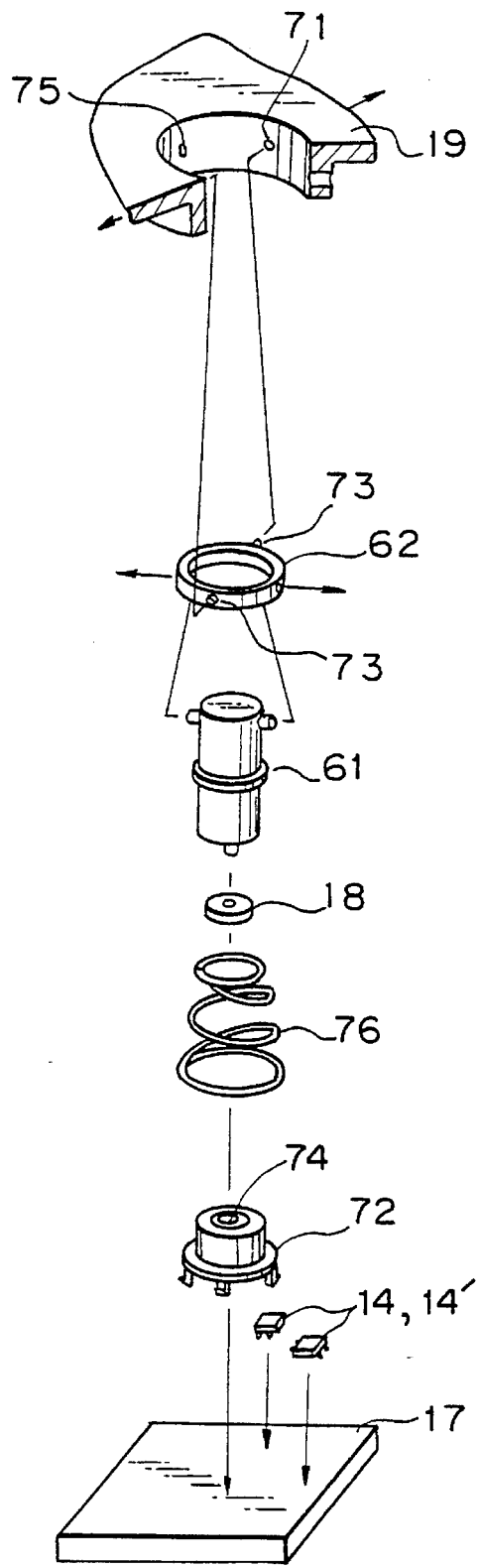
FIG. 26 is an exploded perspective view of the sixth embodiment of the invention, shown in FIG. 25.

FIGS. 25 and 26 show the sixth embodiment of the present invention, in which FIG. 25 shows a sectional view when assembled and FIG. 26 shows an exploded perspective view. In these figures, components corresponding to those of the embodiment shown in FIG. 21 are represented by the same reference numerals, and thus a description thereof is omitted. Note, although the configurations of each of the parts of the fifth embodiment and the sixth embodiment are slightly different, the functions remain the same.

Numeral 76 denotes a spring for returning the hole member 61 to the initial position, and is disposed between an outer peripheral flange 50 provided on the hole member 61 and the housing 72.

To make the hole member 61 movable in any desired direction, the sixth embodiment is provided with projections 73 of the coupling 62 inserted through two openings 71 formed symmetrically on the inner side surface of the casing 19 and projections 73 provided on the upper side surface of the hole member 61 inserted in holes 75 formed symmetrically at positions offset from the projections 73 by 90°, for example Accordingly, the hole member 61 is movable in any direction.

Figure 27:
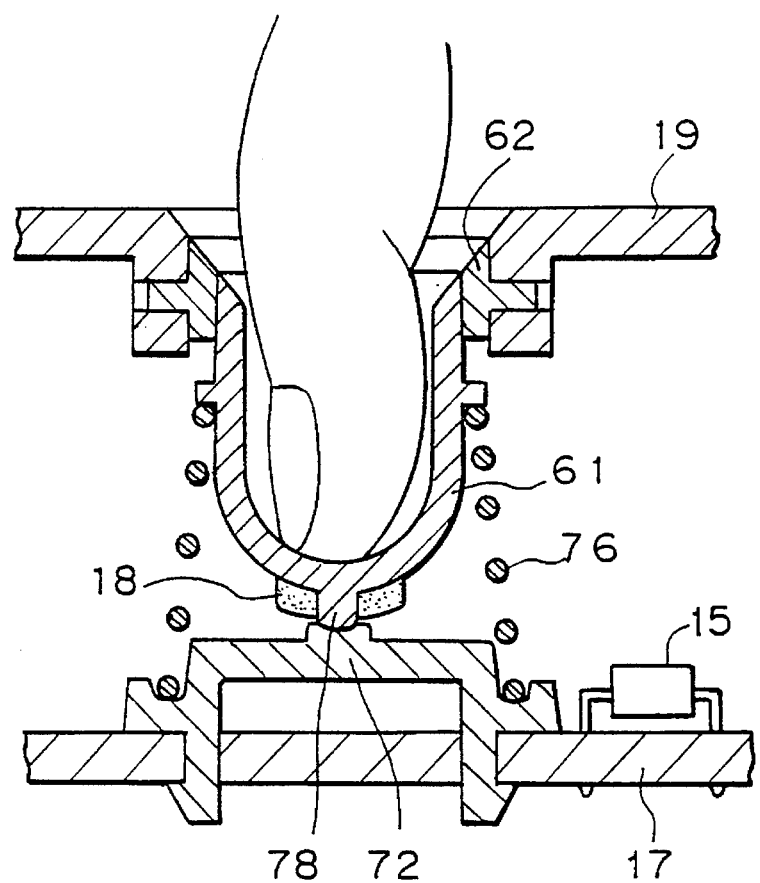
FIG. 27 is sectional view of a seventh embodiment of the invention.

FIG. 27 shows the condition in which the finger is actually inserted. Similar to the condition illustrated in FIG. 24, the hole member 61 can be moved by bending the finger about the joint thereof.

As a means for positioning the hole member 61 at the origin position a projection 78 is formed at the lower portion of the hole member 61. At the origin position (initial position) of the hole member 61, the projection engages with a corresponding recess 74 formed on the housing, and thus is stably held at the initial position as shown in FIG. 25.

The projection 78 can be easily released from the recess 74 when the hole member 61 is operated, and is returned to the origin position by the force of the coil spring 76.

Figure 28:
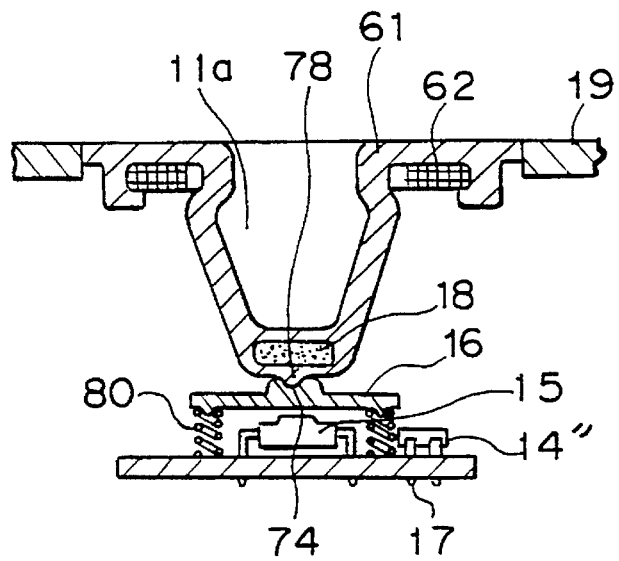
FIG. 28 is sectional view of an eighth embodiment of the present invention.

FIG. 28 shows a section of the seventh embodiment of the present invention, which corresponds to the construction of FIG. 21 to which the concept of the sixth embodiment is applied.

In FIG. 28, the hole member 61 is formed of an elastic material having relatively large elastic modules, and therefore, the spring 76 shown in FIGS. 25 to 27 becomes unnecessary, due to the ability for a self-alignment to the origin position by the elastic force thereof. The recess 74 for engagement with the projection 78 on the bottom of the hole member 61, i.e., forming the origin positioning means, is formed on the key top 16; 80 denotes a spring for depressing the key top 16 onto the hole member 61 by which the projection 78 can be stably held in the recess 74. Note, the spring 80 also has a function equivalent to that of the spring 76 of the embodiment of FIG. 25.

Figure 29:
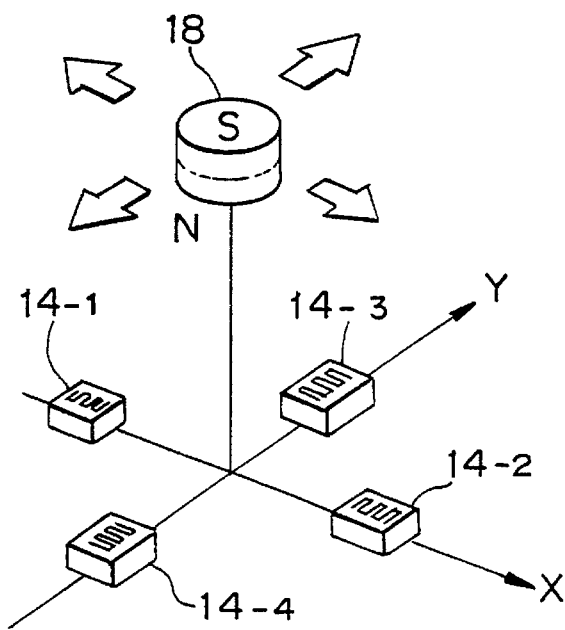
FIG. 29 and 30 are schematic views explaining how to detect a slider displacement.
Figure 30:
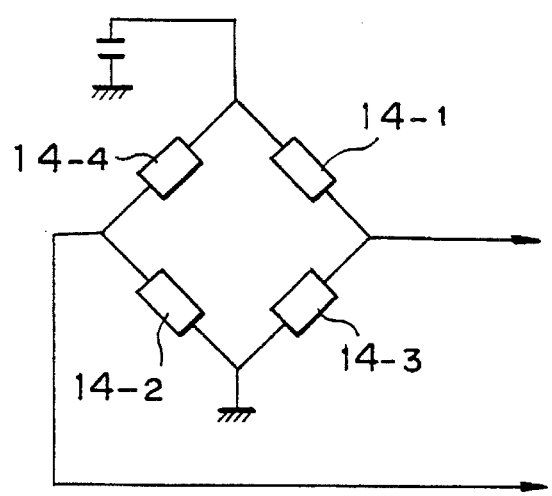

As an alternative to the arrangement shown in FIGS. 9A and 9B, it is possible to arrange four magnetically reluctant elements 14-1, 14-2, 14-3 and 14-4 at four directions with respect to the permanent magnet 18, as shown in FIGS. 29 and 30. Note, even in this case the magnetizing direction is vertical.

FIGS. 31A and 31B show the range of movement of the hole member 61.

In FIG. 31A, when the hole member 61, and accordingly the magnet 18, is inclined from the position illustrated by a solid line to the position illustrated by the one-dot line, the total displacement magnitude is r1+r2, in which the r1 shown by the one-dot line is assumed to be the initial displacement range. When observed in a plan view as shown in FIG. 31B, the initial displacement range becomes a circle having the radius r1. This initial displacement range corresponds to the range of a substantially small magnitude of displacement obtained by inserting the finger, or a small action of the finger when inserted therein.

FIG. 32 shows one embodiment of a table in the MPU 45. Preferably, the cursor or pointer is maintained within the initial displacement range r1, i.e., until the voltage output from the detecting device reaches the voltage value 8, the counter value is maintained at zero and no count is made. This improves the accuracy of the measurement.

As set forth above, according to the embodiments illustrated in FIGS. 21 to 32, a compact and thin pointing device can be realized by providing a hole member in the casing as a finger insertion hole. Also, a lowering of the power consumption makes it applicable to laptop, note book or palm type computers. Also, by building the device into the keyboard of a desk top type computer, it becomes unnecessary to provide the working space usually required for the conventional mouse and digitizer, to thus save space.

Figure 33:
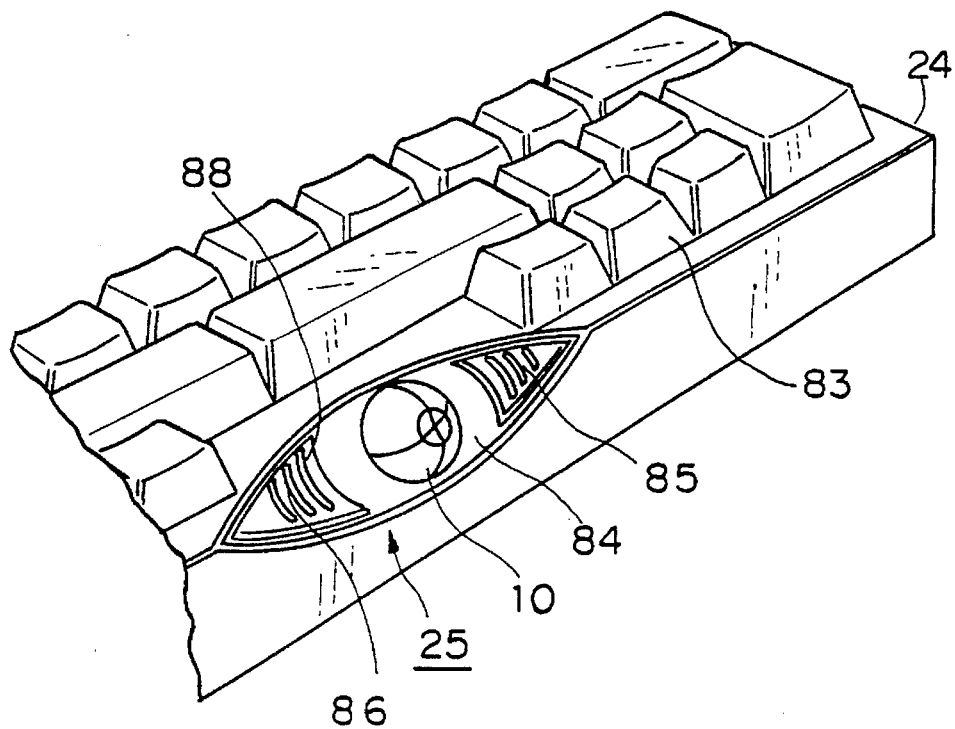
FIG. 33 is a partial perspective view of a keyboard on which a pointing control device of the present invention is provided, at the front edge thereof.

FIG. 33 shows the pointing device 25 shown in FIG. 13 provided in the form of an elongated-oval recess 84 in the front side edge 83 of the key board 24. In this figure, the upper slider 10 is exposed to the outside.

Further two input keys 85 and 86 are arranged in the recessed elongated oval portion 84 on opposite sides of the slider 10.

Namely, as shown in the foregoing FIG. 13, when only one input key is required, only the switch 15 need be provided on the printed circuit board 17, but when two switches are required, the operation is facilitated by arranging the switches symmetrically with respect to the slider 10.

Figure 34:
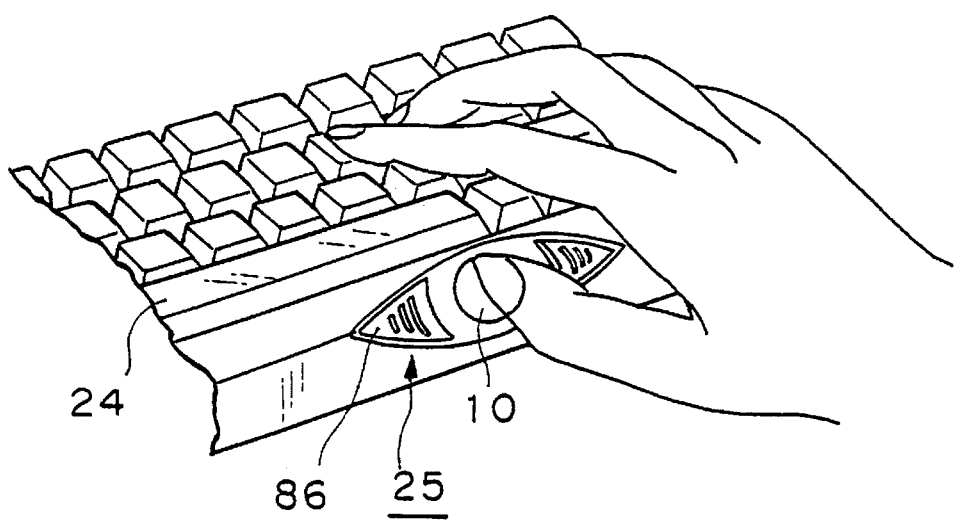
FIG. 34 is a perspective view similar to FIG. 33, showing the device in an operational position.

FIG. 34 shows the device when in use.

The present invention integrates the keyboard and the cursor moving device by providing the cursor moving device, which includes the pointing device and the input key, on the front side surface, left side surface or right side surface of the keyboard.

The tapered oval-like portion 84 is formed as a recess, and the input keys 85 and 86 are formed as a col-shape with a stepped down center portion. The input keys 85 and 86 are provided with an anti-slip member (e.g., projection) 88 on the surface thereof.

As shown in FIG. 34, the device according to the invention is preferably arranged such that an operation of the slider by the thumb 26 at the home position is facilitated. In this figure, the index finger 27 is on the J key of the keyboard.

Figure 35:
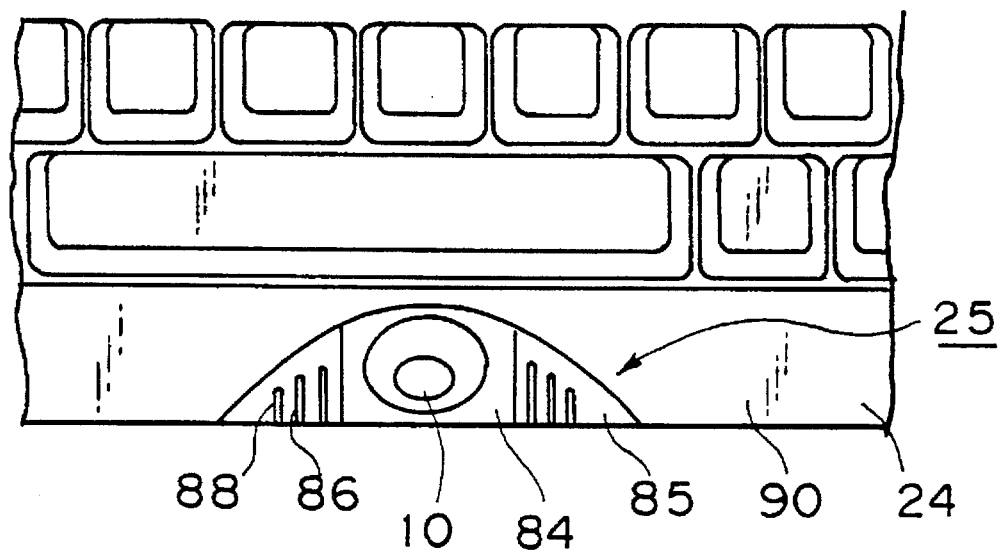
FIG. 35 is a plan view of a keyboard shown in FIG. 33.
Figure 36:
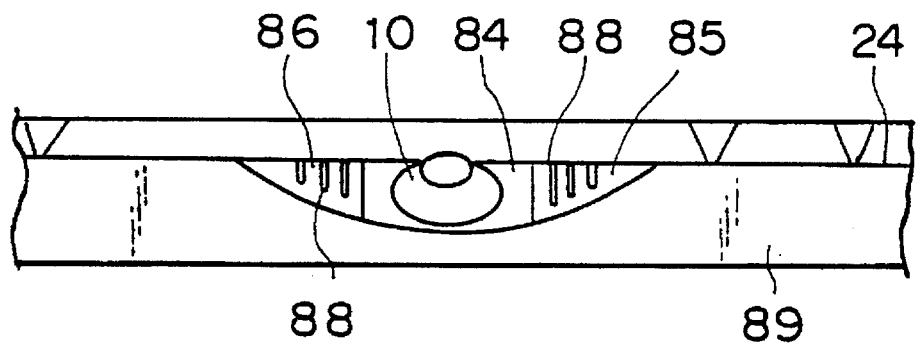
FIG. 36 is a front elevation of a keyboard shown in FIG. 33.

FIGS. 35 and 36 are a plan view and a side elevation view in which the slider 10 of the control device 25 is positioned on a front upper surface 90 and a front end face 89 of the keyboard 24, respectively. Anti-slip members 88 are provided on the surface of the input keys 85 and 86.

Figure 37:
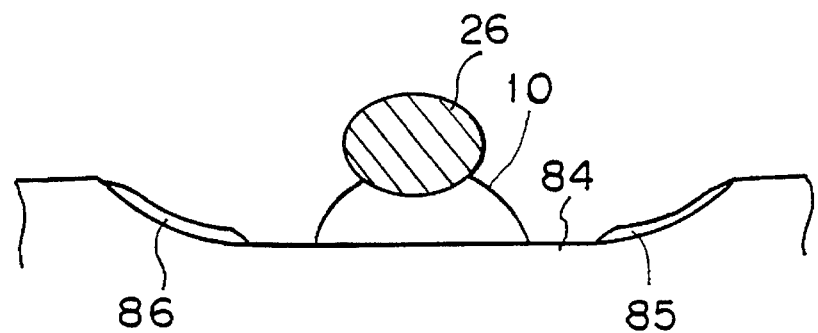
FIGS. 37 and 38 are explanatory views showing a slider and input keys in different operational positions.
Figure 38:
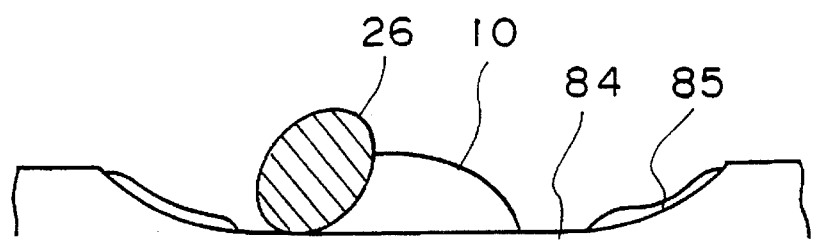

FIG. 37 shows the condition in which the finger 26 (or 27) is placed on the slider 10, and FIG. 38 shows a condition in which the slider 10 is moved to the left by the finger 26 (or 27). A good operability can be provided by causing the slider 10 to stop when the finger touches the tapered recess portion 84.

Figure 39:
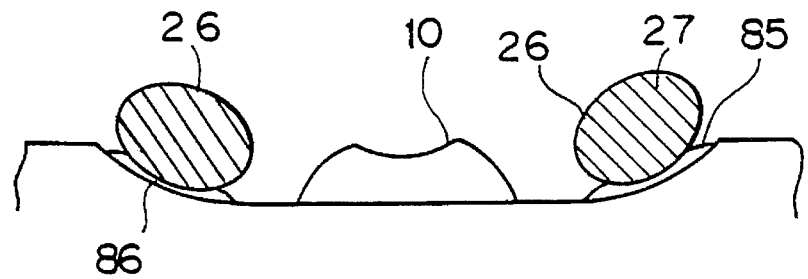
FIG. 39 is an explanatory view showing a slider and a pair of input keys when manipulated by the operator's fingers.

FIG. 39 shows a condition in which two fingers (e.g., index finger 26 and thumb 27) are placed on the two input keys 85 and 86.

Figure 40:
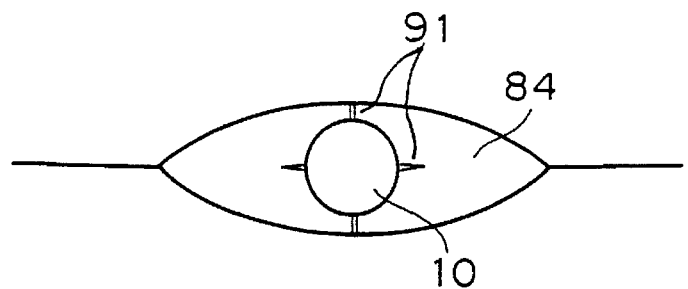
FIG. 40 is a plan view showing a relationship between a tapered surface portion and a slider.

FIG. 40 is a plan view showing a positional relationship between the recessed portion 84 and the slider 10. The markings 91 in X and Y directions are provided for facilitating the slider operation.

As set forth above, by providing the recessed elongated oval-like portion on the side surface of the keyboard, and by providing the pointing device and the input key or keys in the recessed portion, the cursor moving device 25 can be built-in to the keyboard to thus provide an enhanced operability, and further, such a cursor moving device 25 can be applied to a laptop computer.

Figure 41:
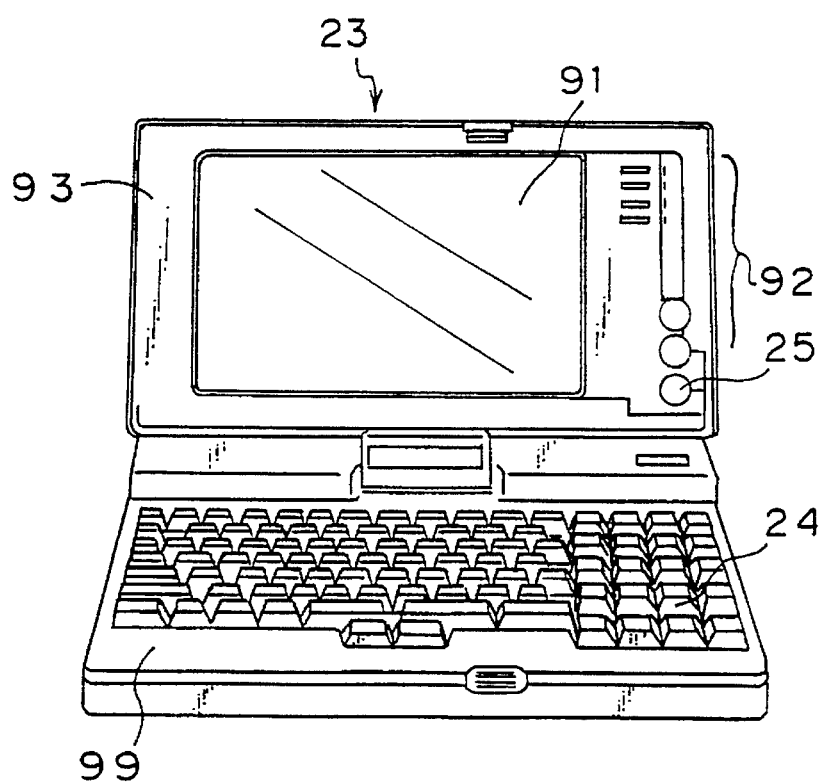
FIG. 41 is a front elevational view of a portable computer provided with a pointing control device 4 of the present invention.

FIG. 41 shows another arrangement of the pointing control device 25 of the invention when incorporated in a portable computer 23 as shown in FIG. 6A. In FIG. 41, 91 designates a display panel, 92 an indicating portion including an adjustment of the brightness of the display and a back light, a power source lamp, a battery lamp, and a disk drive lamp, and 93 a display portion, respectively. In general, the portable computer 23 is comprised of a body 99 having a key board 24 and a display portion 93 which can be closed to form one body therewith when not in use. The pointing control device 25 of the invention is located on the display portion 93 in the vicinity of the right lower corner thereof. This area of the display portion 93 in which the pointing control device 25 is located in the present invention is usually unused in a conventional portable computer 23.

Figure 42:
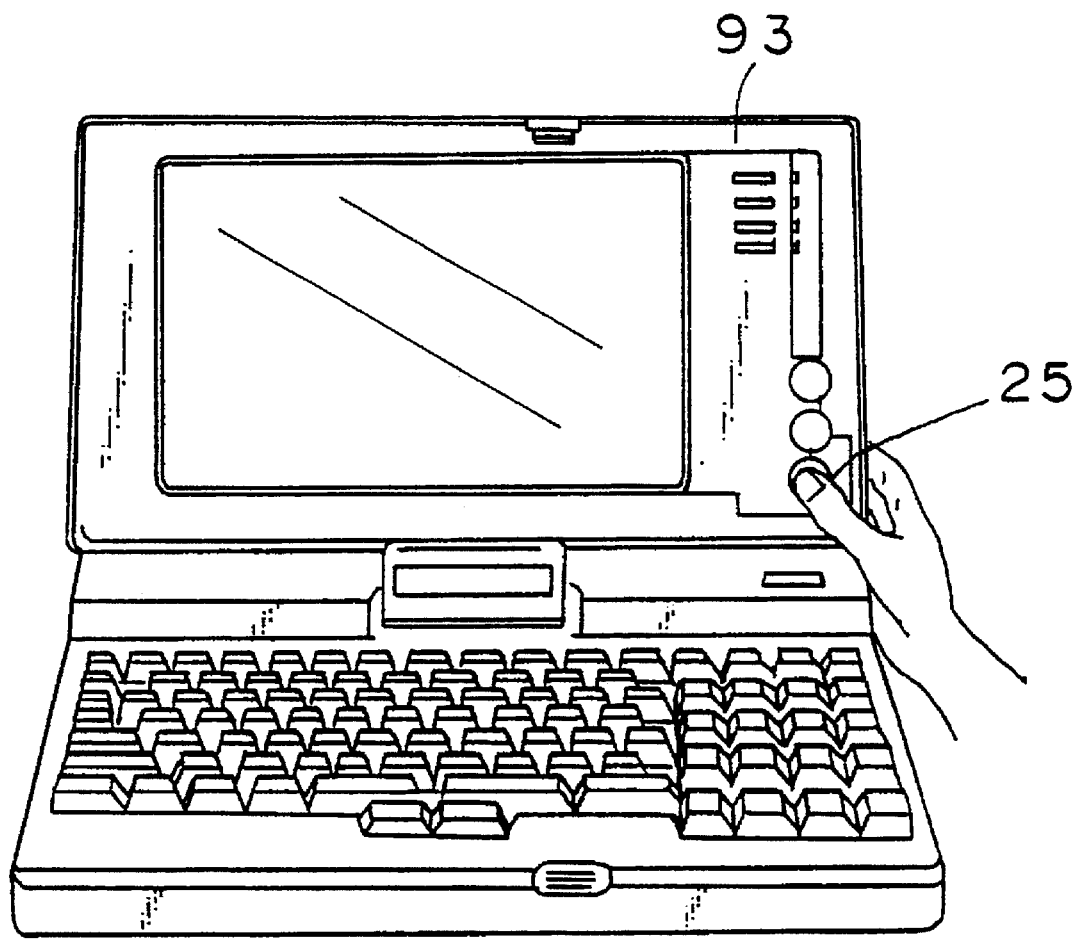
FIG. 42 is a view similar to FIG. 41, showing an operating position thereof.

FIG. 42 shows the pointing control device 25 actuated by an operator. To move the cursor or the pointer, the operator puts his or her thumb of the right hand onto the pointing control device 25, which is positioned so as to provide a good operability.

Figure 43:
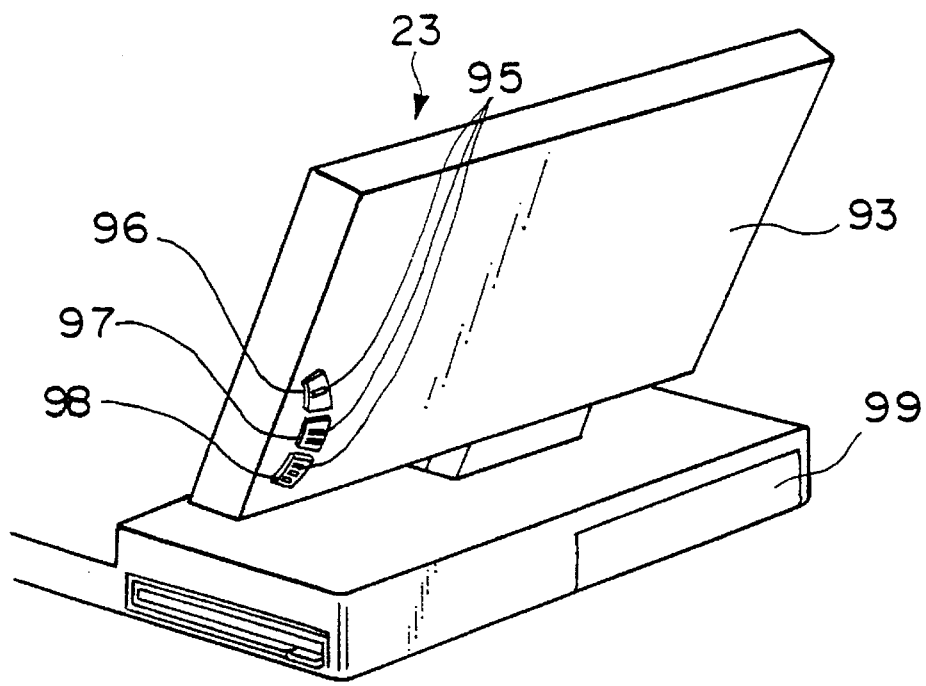
FIG. 43 is a perspective view of a portable computer shown in FIG. 41, viewed from behind.

FIG. 43 shows a portable computer 23 viewed from behind. In FIG. 43, numerals 96, 97 and 98 designate first, second and third button switches corresponding to function buttons (click buttons, drag buttons, etc.) of the mouse, and 95 projections or recesses, or a combination thereof, for discriminating the first, second and third button switches. The number of the button switches is not limited to three, and can be more or less than three, depending on the mouse to be used.

The button switches are preferably arranged in a sector shape along an arc of a circle having a radius approximately corresponding to the length of any finger, and agreeing with the configuration of the fingers, as shown in FIG. 43, to thus improve the operability.

Figure 44:
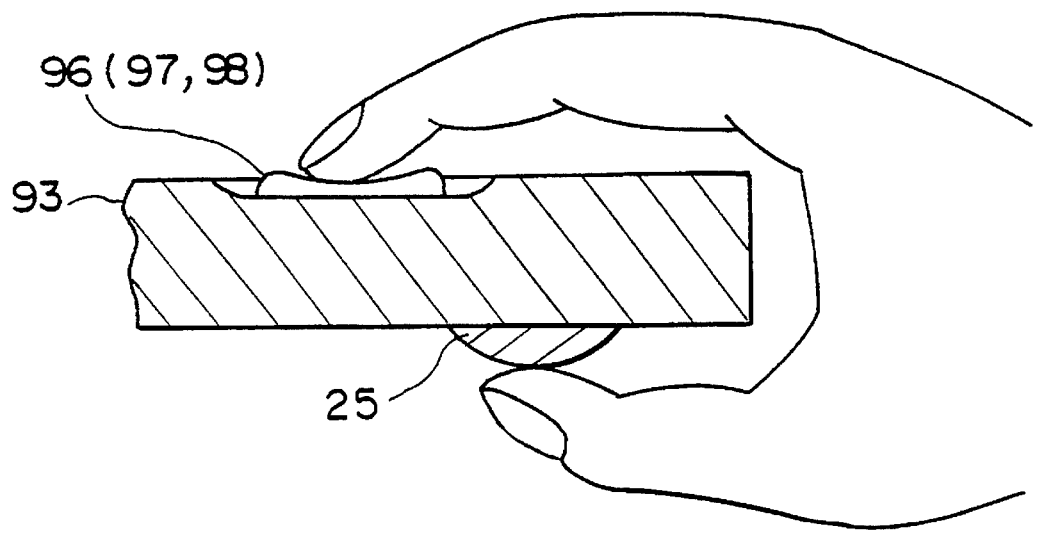
FIG. 44 is an enlarged plan view of a part of an operating portion of a portable computer shown in FIG. 41.
Figure 45A:
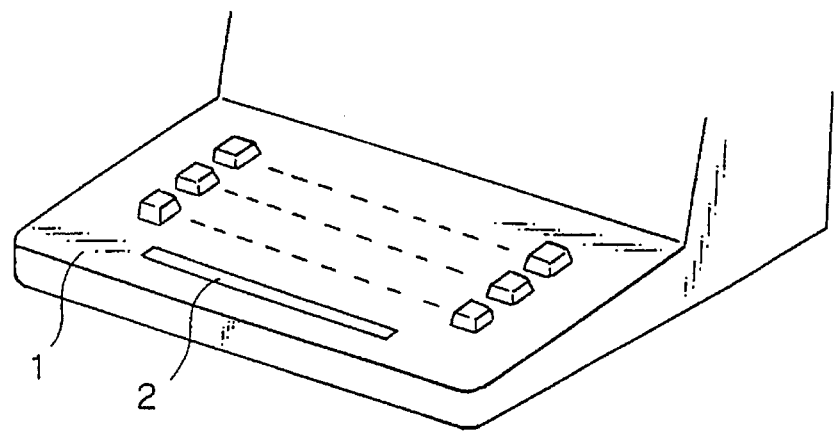
FIGS. 45A, 45B and 45C are perspective views showing three examples of known pointing control devices.
Figure 45B:
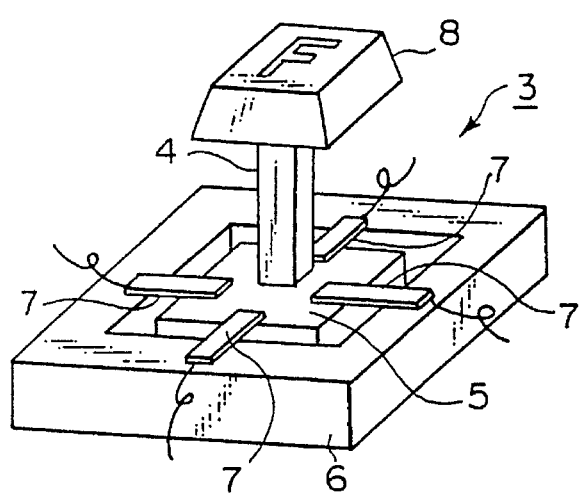
Figure 45C:
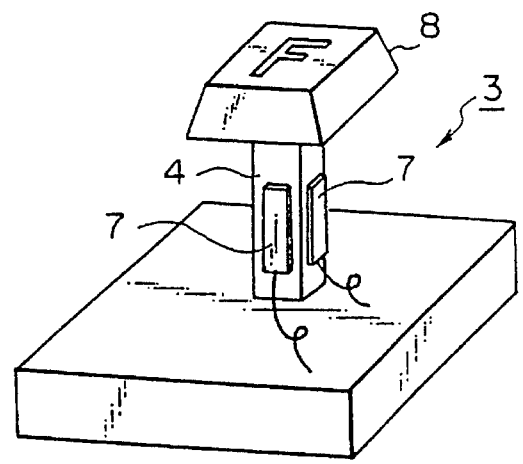

As can be seen in FIG. 44, when in use, the operator can actuate a desired button switch 96, 97 or 98, for example, with his or her index finger or middle finger, while actuating the slider 10 of the pointing control device 25 by using the thumb.

We claim:

1. In a device for moving a pointer or cursor to a desired position on a display of a computer, a pointing control device comprising:

a support;

a manually movable actuating member located above the support and movably supported on the support;

a single permanent magnet provided inside said manually movable actuating member; and two magnetic reluctance type detectors, located within said support and beneath said manually movable actuating member and said single permanent magnet, for detecting a magnitude of movement of the manually movable actuating member within a unit of time, a diameter of said magnet being smaller than a distance between said two magnetic reluctance type detectors, wherein each magnetic reluctance type detector includes a pair of magnetically reluctant elements provided for each of two directions of detection, said magnet provided between and above the magnetic reluctance type detectors and said magnet moves above said magnetic reluctance type detectors, and wherein the pointer or the cursor can be moved in accordance with the detected magnitude of the manually movable actuating member.

2. A pointing control device for moving a pointer or cursor to a desired position on a display of a computer, a pointing control device comprising:

a support;

a manually movable actuating member movably supported by the support;

a single permanent magnet provided inside said manually movable actuating member; and two magnetic reluctance type detectors, located within said support, for detecting a magnitude of movement of the manually movable actuating member within a unit of time, a diameter of said magnet being smaller than a distance between said two magnetic reluctance type detectors, wherein the pointer or the cursor can be moved in accordance with the detected magnitude of the manually movable actuating member, and wherein said manually movable actuating member is a plate-like slider slidably supported on the support.

3. A pointing control device according to claim 2, wherein said slider has a dome-shaped configuration, and said slider is spherically slidable in a desired direction.

4. A pointing control device according to claim 3, wherein said dome-shaped slider is provided with a crater-form recess.

5. A pointing control device according to claim 3, wherein said slider is provided with a center small projection, so that a position of the slider can be recognized when touched by an operator's finger.

6. A pointing control device according to claim 3, further comprising a casing for housing the slider in such a manner that the slider is partially exposed.

7. A pointing control device according to claim 6, wherein said casing is provided with a recess surrounding an exposed portion of the slider.

8. A pointing control device according to claim 6, wherein an upper surface of said support is provided with an annular projection, and wherein a lower surface of said slider is provided with radial projections which engage with the annular projection of the support.

9. A pointing control device according to claim 2, further comprising means for stopping the slider at an origin position thereof.

10. A pointing control device according to claim 2, wherein said slider is made of a flat plate slidably supported on the support in a horizontal direction.

11. A pointing control device according to claim 10, wherein an upper surface of said slider is provided with an annular projection.

12. A pointing control device according to claim 2, further comprising a switch which is actuated by the slider.

13. A pointing control device according to claim 2, further comprising an acceleration control means for controlling a detecting signal of magnetically reluctant elements as acceleration.

14. A pointing control device according to claim 2, wherein said slider is at least partially made of a magnetized material.

15. A pointing control device according to claim 2, further comprising a returning means for returning said slider to an origin position thereof.

16. A pointing control device according to claim 15, wherein said returning means comprises at least one spring provided between the slider and an immovable portion of the device.

17. A pointing control device according to claim 15, wherein said returning means comprises a rubber piece provided between the slider and the support.

18. A pointing control device according to claim 1, wherein a position of said actuating member is detected due to a magnetic reluctance effect of the magnetically reluctant elements.

19. A pointing control device according to claim 1, wherein said manually movable actuating member is a hole member slidably supported on the support and having a finger insertion hole in which an operator's finger can be inserted.

20. A pointing control device according to claim 19, wherein said support is constituted by a casing for movably holding the hole member.

21. A pointing control device according to claim 20, wherein said hole member is formed of an elastic material.

22. A pointing control device according to claim 21, further comprising a retaining means for retaining a shape of the elastic hole member.

23. A pointing control device according to claim 20, further comprising means for stopping the hole member at an origin position thereof.

24. A pointing control device according to claim 20, wherein said permanent magnet is provided on a bottom of the hole member.

25. A pointing control device according to claim 24, wherein a position of the hole member is detected due to a magnetic reluctance effect of the magnetically reluctant elements.

26. A pointing control device according to claim 20, further comprising a returning means for returning said hole member to an origin position thereof.

27. A pointing control device according to claim 26, wherein said returning means comprises a spring provided between the hole member and an immovable portion of the device.

28. A pointing control device according to claim 20, further comprising a switch actuated by a movement of the hole member.

29. A pointing control device according to claim 21, further comprising an acceleration control means for controlling a detecting signal of magnetically reluctant elements as acceleration.

30. A pointing control device according to claim 29, further comprising a control means for assuming the acceleration to be zero within a predetermined initial motion region of the hole member.

31. A portable computer comprising:

a keyboard; and a pointing control device, said pointing control device including a support, a manually movable actuating member movably supported above the support, a single permanent magnet provided inside said manually movable actuating member, and two magnetic reluctance type detectors, located within said support and beneath said manually movable actuating member and said single permanent magnet, for detecting a magnitude of movement of the movable actuating member within a unit of time, a diameter of said magnet being smaller than a distance between said two magnetic reluctance type detectors, wherein each magnetic reluctance type detector includes a pair of magnetically reluctant elements provided for each of two directions of detection, said magnet provided between and above the magnetic reluctance type detectors and said magnet moves above said magnetic reluctance type detectors, and wherein the pointer or cursor can be moved in accordance with the detected magnitude of the movable actuating member.

32. A portable computer according to claim 31, wherein said pointing control device is provided on a front side of the keyboard.

33. A portable computer according to claim 32, wherein the manually movable actuating member of the pointing control device is located on a front side edge of the keyboard.

34. A portable computer according to claim 32, wherein the manually movable actuating member of the pointing control device is located on a front upper surface of the keyboard.

35. A portable computer according to claim 32, wherein the manually movable actuating member of the pointing control device is located on a front end face of the keyboard.

36. A portable computer according to claim 32, wherein the pointing control device comprises a pair of input keys located on opposite sides of the manually movable actuating member.

37. A portable computer according to claim 36, wherein the pointing control device is provided with a recessed portion in which the input keys are provided.

38. A portable computer according to claim 37, wherein said pointing control device comprises a marking which represents a direction of the movement of the manually movable actuating member.

39. A portable computer according to claim 38, wherein said input keys are provided thereon with a non-slip means.

40. A portable computer according to claim 37, wherein said recessed portion has a shape of an elongated oval when viewed from a front thereof.

41. A portable computer according to claim 31, further comprising a display portion with a display panel, and wherein said pointing control device is provided on a front face of the display portion.

42. A portable computer according to claim 41, wherein said pointing control device is provided in a vicinity of a corner of the front face of the display portion.

43. A portable computer according to claim 42, wherein said display portion is provided on a rear face thereof with function buttons corresponding to function buttons of an existing mouse, on a side opposite to that of the pointing control device.

44. A portable computer according to claim 43, wherein said function buttons of the display portion are located in a substantially sector arrangement.

45. A portable computer according to claim 43, further comprising a discriminating means for discriminating the function buttons on the display portion.

* * * * *